(12) United States Patent
Hatton et al.

(10) Patent No.: US 11,572,293 B2
(45) Date of Patent: Feb. 7, 2023

(54) ASYMMETRIC ELECTROCHEMICAL SYSTEMS AND METHODS

(71) Applicant: Massachusetts Institute of Technology, Cambridge, MA (US)

(72) Inventors: Trevor Alan Hatton, Sudbury, MA (US); Xianwen Mao, Ithaca, NY (US); Yinying Ren, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/924,094

(22) Filed: Jul. 8, 2020

(65) Prior Publication Data
US 2021/0009441 A1     Jan. 14, 2021

Related U.S. Application Data

(60) Provisional application No. 62/871,520, filed on Jul. 8, 2019.

(51) Int. Cl.
*C25B 9/17*     (2021.01)
*C02F 1/461*     (2006.01)
(Continued)

(52) U.S. Cl.
CPC .......... *C02F 1/46109* (2013.01); *C02F 1/285* (2013.01); *C02F 1/469* (2013.01);
(Continued)

(58) Field of Classification Search
None
See application file for complete search history.

(56) References Cited

U.S. PATENT DOCUMENTS

| 3,730,885 A | 5/1973 | Makrides et al. |
| 4,775,556 A | 10/1988 | Krause et al. |

(Continued)

OTHER PUBLICATIONS

Tian, Wenda, Nanostructured Electroactive Polymeric Composites for Energy Storage and Separation Applications, Thesis, Massachusetts Institute of Technology, Department of Chemical Engineering, 2018 (no month listed, catalogued by MIT library as of May 2019), pp. 1-137 (Year: 2019).*

(Continued)

*Primary Examiner* — Harry D Wilkins, III
(74) *Attorney, Agent, or Firm* — Wolf, Greenfield & Sacks, P.C.

(57) ABSTRACT

An asymmetric system containing a first conductive polymer modified with a redox active moiety and a second conductive polymer modified with a surfactant is used for the separation of organic compounds from aqueous solutions. The asymmetric system has complementary hydrophobicity tunability in response to electrochemical modulations. For example, both materials are hydrophobic in their respective neutral states, therefore exhibiting affinity toward organic compounds. Application of a mild potential drives the desorption of the organic compounds and regeneration of the materials. The asymmetric system can be used in a cyclic fashion, through repeated electrical discharge or shorting of the two electrodes to program the capture of organics from a feed solution, and application of a potential to stimulate the release of the adsorbed organics.

15 Claims, 17 Drawing Sheets

(51) Int. Cl.
*C02F 1/28* (2006.01)
*C02F 1/469* (2006.01)
*C02F 101/30* (2006.01)
*C02F 101/36* (2006.01)
*C02F 101/34* (2006.01)

(52) U.S. Cl.
CPC ............ *C02F 1/46104* (2013.01); *C25B 9/17* (2021.01); *C02F 2001/46138* (2013.01); *C02F 2101/306* (2013.01); *C02F 2101/308* (2013.01); *C02F 2101/34* (2013.01); *C02F 2101/36* (2013.01); *C02F 2303/16* (2013.01)

(56) References Cited

U.S. PATENT DOCUMENTS

| | | | |
|---|---|---|---|
| 5,425,858 | A | 6/1995 | Farmer |
| 7,658,828 | B2 | 2/2010 | Freydina et al. |
| 2007/0080115 | A1 | 4/2007 | Sylvester |
| 2012/0211367 | A1 | 8/2012 | Vecitis |
| 2017/0113951 | A1* | 4/2017 | Su .......................... C02F 1/469 |
| 2018/0148354 | A1 | 5/2018 | Bayram |
| 2019/0055371 | A1 | 2/2019 | Liu |
| 2019/0071328 | A1 | 3/2019 | Mao et al. |

OTHER PUBLICATIONS

Xu et al, On-Demand Capture and Release of Organic Droplets Using Surfactant-Doped Polypyrrole Surfaces, ACS Applied Materials & Interfaces, vol. 9, No. 27, Jun. 2017, pp. 23119-23127 (Year: 2017).*

Su et al, Redox-electrodes for selective electrochemical separations, Advances in Colloid and Interface Science, vol. 244, Jun. 2017, pp. 6-20 (Year: 2017).*

Ren et al., An Asymmetric Electrochemical System with Complementary Tunability in Hydrophobicity for Selective Separations of Organics. ACS Cent Sci. 2019;5(8):1396-1406. doi:10.1021/acscentsci. 9b00379.

International Search Report and Written Opinion dated Sep. 24, 2018 for Application No. PCT/US2018/040444.

International Preliminary Report on Patentability dated Jan. 9, 2020 for Application No. PCT/US2018/040444.

De et al., Ni-based bimetallic heterogeneous catalysts for energy and environmental applications. Energy Environ Sci. 2016;9:3314-47. Epub Sep. 15, 2016.

Mao et al., Energetically efficient electrochemically tunable affinity separation using multicomponent polymeric nanostructures for water treatment. Energy Environ Sci. 2018;11:2954-63.

Ren et al., Superhydrophobic, surfactant-doped, conducting polymers for electrochemically reversible adsorption of organic contaminants. Adv Funct Mater. Aug. 8, 2018;28(32):1801466(1-12). Epub Jun. 22, 2018.

Su et al., Asymmetric Faradaic systems for selective electrochemical separations. Energy Environ Sci. 2017;10:1272-83. Epub Apr. 18, 2017.

Suss et al., Water desalination via capacitive deionization: what is it and what can we expect from it? Energy Environ Sci. 2015;8:2296-319. Epub May 5, 2015.

Tian et al., Electrochemically nanostructured polyvinylferrocene/polypyrrole hybrids with synergy for energy storage. Adv Funct Mater. 2015;25:4803-13.

* cited by examiner

| Positive electrode | Negative electrode | Potential (V) | Final pH | % charge towards water splitting |
|---|---|---|---|---|
| PVF-PPy | PPy(AOT) | 0.0 | 6.97 | 0.00 |
| PVF-PPy | PPy(AOT) | 0.3 | 7.13 | 0.04 |
| PVF-PPy | PPy(AOT) | 0.9 | 7.29 | 0.04 |
| PVF-PPy | PPy(AOT) | 1.2 | 7.30 | 0.03 |
| PVF-PPy | Pt | 0.7 | 10.41 | 42.0 |
| Pt | PPy(AOT) | 0.5 | 5.48 | 0.81 |

FIG. 8A

| Metric | Activated carbons | PVF-PPy/PPy(AOT) | |
|---|---|---|---|
| | Thermal | 0V - 1.2 V | 0.3 V - 0.9 V |
| Energy consumption (J g adsorbent) | 235 | 27 | 12 |
| Specific energy consumption (SE) (J g contaminant) | 1474 | 2395 | 1258 |

FIG. 8B

ASYMMETRIC ELECTROCHEMICAL SYSTEMS AND METHODS

RELATED APPLICATIONS

This application claims priority under 35 U.S.C. § 119(e) to U.S. Provisional Patent Application No. 62/871,520, filed Jul. 8, 2019, and entitled "An Asymmetric Electrochemical System with Complementary Tunability in Hydrophobicity for Selective Separations of Organics," which is incorporated herein by reference in its entirety for all purposes.

TECHNICAL FIELD

Asymmetric electrochemical systems and methods related to the separation of organic compounds from aqueous solutions are generally described.

BACKGROUND

Chemical separations processes are energy-intensive, and are responsible for 10 to 15% of the world's total energy consumption, with distillation, evaporation, and other conventional technologies accounting for more than 80% of this energy expenditure. Improved separation efficiencies can be achieved through more recent technologies such as reverse osmosis, nanofiltration, and capacitive deionization, which are particularly effective for removing charged ions from water. The separation of neutral organic compounds in processes such as wastewater treatment and pharmaceutical product purification is also of importance. Accordingly, improved systems and methods related to the separation of organic compounds are necessary.

SUMMARY

Asymmetric electrochemical systems and methods related to the separation of organic compounds from aqueous solutions are generally described. The subject matter of the present disclosure involves, in some cases, interrelated products, alternative solutions to a particular problem, and/or a plurality of different uses of one or more systems and/or articles.

In some embodiments, an electrochemical cell is described. The electrochemical cell comprises, in certain embodiments, a first electrode comprising a first electrically conductive substrate and a first coating disposed on at least a portion of the first electrically conductive substrate, wherein the first coating comprises a first adsorbent polymer and a redox-active polymer. In certain embodiments the electrochemical cell comprises a second electrode comprising a second electrically conductive substrate and a second coating disposed on at least a portion of the second electrically conductive substrate, wherein the second coating comprises a second adsorbent polymer and a surfactant.

According to certain embodiments, a method of separating a target molecule from a fluid source is described, the method comprising placing a first electrode into a fluid source, wherein the first electrode comprises a first electrically conductive substrate and a first coating disposed on at least a portion of the first electrically conductive substrate, wherein the first coating comprises a first adsorbent polymer and a redox-active polymer; placing a second electrode into the fluid source, wherein the second electrode comprises a second electrically conductive substrate and a second coating disposed on at least a portion of the second electrically conductive substrate, wherein the second coating comprises a second adsorbent polymer and a surfactant; and allowing the first electrode and/or the second electrode to adsorb the target molecule from the fluid source.

In certain embodiments, a method of desorbing a target molecule into a fluid source is described, the method comprising applying a potential to an electrochemical cell, wherein the electrochemical cell comprises a first electrode placed in a fluid source, wherein the first electrode comprises a first electrically conductive substrate and a first coating disposed on at least a portion of the first electrically conductive substrate, wherein the first coating comprises a first adsorbent polymer and a redox-active polymer; a second electrode placed in the fluid source, wherein the second electrode comprises a second electrically conductive substrate and a second coating disposed on at least a portion of the second electrically conductive substrate, wherein the second coating comprises a second adsorbent polymer and a surfactant; and a target molecule adsorbed by the first adsorbent polymer and/or the second adsorbent polymer. In certain embodiments, the method comprises allowing the first electrode and/or the second electrode to desorb the target molecule into the fluid source.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 8A shows, according to certain embodiments, final solution pH after applying different to electrochemical cells assembled with electrodes coated with different PPy-based polymers or platinum (Pt); and FIG. 8B shows, according to certain embodiments, a comparison of the energy efficiencies for activated carbons regenerated by thermal desorption, and the asymmetric system regenerated electrochemically.

DETAILED DESCRIPTION

Figure 1A:
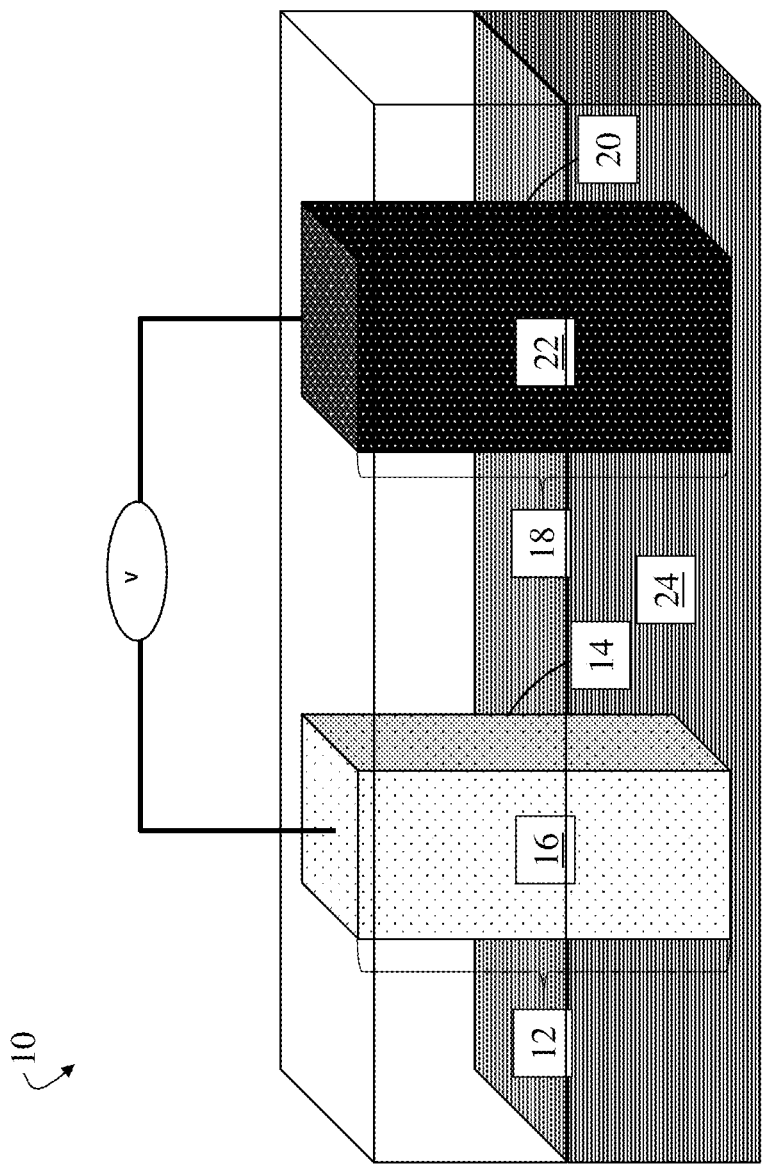
FIG. 1A shows, according to certain embodiments, a schematic diagram of an asymmetric cell comprising a first electrode and a second electrode.

The present invention is based on the discovery that adsorption agents may be disposed on electrically conductive substrates either in the presence of a redox-active species or a surfactant. Such configurations allows the electrically conductive substrates to be responsive to electrochemical modulations, resulting in tunability of the hydrophobicity of the overall electrochemical system. In certain embodiments, for example, an adsorbent polymer (e.g., polypyrrole) is disposed on two electrically conductive (e.g., carbon) substrates. The first electrically conductive substrate is deposited with a redox-active polymer (e.g. a metallocene), while the second electrically conductive substrate is doped with an amphiphilic surfactant (e.g., an anionic surfactant), therefore resulting in each electrode comprising a hydrophobic coating. The asymmetric system may be paired as opposing electrodes in order to adsorb an organic compound (e.g., neutral organic compound) at no energetic cost. The organic compound may be desorbed from the electrodes by applying an electrical voltage, thereby oxidizing the first electrode comprising the mixture of the adsorbent polymer and the redox-active species and reducing the second electrode comprising the adsorbent polymer doped with the surfactant. Such an application of electrical potential therefore renders both electrodes hydrophilic, resulting in displacement of the organic species adsorbed to the adsorbent polymers by water. The asymmetric system may subsequently be regenerated by applying a second electrical potential in order to render the first electrode and/or the second electrode hydrophobic. The adsorption/desorption/regeneration process may be repeated a number of times. Such an asymmetric system may, for example, be used to successfully remove certain organic compounds (e.g., pollutants, synthetic byproducts) from fluid sources.

Conventional wastewater or drinking water treatment plants are not specifically equipped for eliminating neutral organic contaminants, which can therefore pass through domestic and industrial wastewater discharges and end up in the aquatic environment. Many neutral organic contaminants have proven to have ecotoxicological effects on aquatic life, animals and even human beings, that include short-term and long-term toxicity, endocrine disrupting effects and antibiotic resistance of microorganisms. Similar to wastewater treatment, purification of pharmaceutical compounds involves a wide array of organic compounds and is essential for ensuring the quality of medications. Removal of neutral organic species by adsorbents such as activated carbon (AC) is a conventional practice but sorbent regeneration through thermal processes, pH adjustment, or solvent extraction is often challenging or costly. Therefore, AC regeneration is usually performed in centralized treatment facilities, adding transportation cost to the operations. The present invention is in part based on the realization and appreciation that electrical energy is inexpensive, widely available, and can be more efficient compared to the aforementioned conventional ways to regenerate adsorbents. Adsorbents regenerated by electricity present a practical and scalable point-of-use solution for separating neutral organic compounds from aqueous solutions.

Several electrochemical methods have been developed for separation of organic compounds: electrocoagulation consumes iron or aluminum to generate coagulants and can have disadvantages with respect to sustainability and cost of metal electrodes; electrochemical regeneration of activated carbons applies a current to desorb and destroy adsorbed organics but the relatively high current (10 to 100 mA) and long charging period (5 to 40 hours) may be prohibitive for industrial applications.

The asymmetric system described herein affords the electrochemical mediated separation of organic compounds from water by exploiting the complementary tunabilities in hydrophobicity of the opposing electrodes. The asymmetric system described herein avoids or suppresses parasitic water splitting reactions to maintain solution pH and to reduce the loss of electrical energy to side reactions. In energetic efficiency terms, the electrochemically mediated separation technology using the asymmetric system is competitive in comparison with thermally regenerated activated carbons. Furthermore, the asymmetric system displays selectivity for certain organic compounds present in mixtures, suggesting potential applications in pharmaceutical and other such purifications. The ease of implementation of the asymmetric system, only requiring mild electrical energy for regeneration which can potentially be derived from renewable sources, permits electrochemically mediated separations to be performed both in industrial settings and at distributed or remote locations.

In some embodiments, an electrochemical cell as described herein comprises a first electrode and a second electrode. FIG. 1A shows, according to certain embodiments, a schematic diagram of an asymmetric cell comprising a first electrode and a second electrode. As shown in FIG. 1A, electrochemical cell 10 comprises first electrode 12 and second electrode 18. First electrode 12 may, in certain embodiments, comprise first electrically conductive substrate 14 and first coating 16 disposed on at least a portion of first electrically conductive substrate 14. Second electrode 18, in some embodiments, comprises second electrically conductive substrate 20 and second coating 22 disposed on at least a portion of second electrically conductive substrate 20.

Any of a variety of materials may be utilized for the first electrically conductive substrate and/or the second electrically conductive substrate. In certain embodiments, for example, the first electrically conductive substrate and/or the second electrically conductive substrate may comprise carbon, a metal, and/or a metal oxide. In some embodiments, for example, the first electrically conductive substrate and/or the second electrically conductive substrate comprises graphite, graphene, carbon powders, carbon films, carbon fibers, carbon cloths, carbon fabrics, carbon felts, a carbon gas diffusion layer (GDL), and the like. In certain embodiments, the first electrically conductive substrate and/or the second electrically conductive substrate comprises copper, titanium, brass, silver, platinum, palladium, and the like. In certain embodiments, the first electrically conductive substrate and/or the second electrically conductive substrate comprises a mixed metal oxide (MMO). Other electrically conductive substrates are also possible.

In some embodiments, the first electrically conductive substrate and the second electrically conductive substrate may be substantially the same (e.g., the first electrically conductive substrate and the second electrically conductive may comprise carbon). In certain embodiments, the first electrically conductive substrate and the second electrically conductive substrate may be different (e.g., the first electrically conductive substrate comprises carbon and the second electrically conductive may comprises a metal, the first electrically conductive substrate comprises a metal and the second electrically conductive may comprises carbon).

In certain embodiments, first coating 16 comprises an adsorbent polymer (e.g., a first adsorbent polymer) and a redox-active polymer. In some such embodiments, the adsorbent polymer and the redox-active species form a hybrid polymeric coating. For example, in some embodiments, the first coating may comprise a mixture of a neutral adsorbent polymer and a neutral redox-active species. As used herein, the term "adsorbent" is given its ordinary meaning in the art and generally refers to a species that is able adsorb (e.g., adhere) an atom, ion, or molecule from a gas, liquid, or dissolved solid to a surface of the species. The term "redox-active", as used herein, is given its ordinary meaning in the art and generally refers to a species that is able to undergo: (i) an oxidation reaction in which the oxidation state of at least one atom of the species changes by losing at least one electron; and (ii) a reduction reaction in which the oxidation state of at least one atom of the species changes by gaining at least one electron. In some embodiments, the redox-active species is capable of adsorbing the target molecule. In certain embodiments, the first coating renders at least a portion of the first electrode hydrophobic. As used herein, the term "hydrophobic" is given its ordinary meaning in the art and generally refers to a material that tends to repel or fails to mix with water. In certain embodiments, for example, at least a portion of the first coating has a water contact angle greater than 90° (e.g., greater than or equal to 100°, greater than or equal to 120°, greater than or equal to 140°, greater than or equal to 160°, or greater).

First coating 16 may be disposed on at least a portion of first electrode 12 utilizing any of a variety of suitable techniques. In some embodiments, for example, the first coating is disposed on the first electrode by electropolymerization. Other deposition methods may be utilized, in some embodiments, such as, but not limited to, chemical vapor deposition (CVD), plasma enhanced CVD (PECVD), atomic layer deposition (ALD), and/or molecular layer deposition (MLD).

First coating 16 may cover any of a variety of suitable surface areas of first electrode 12. In some embodiments, for example, the first coating covers greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, or greater than or equal to 99% of the surface area of the first electrode. In certain embodiments, the first coating covers less than or equal to 99.9%, less than or equal to 99%, less than or equal to 90%, less than or equal to 80%, less than or equal to 70%, less than or equal to 60%, less than or equal to 50%, less than or equal to 40%, less than or equal to 30%, or less than or equal to 20% of the surface area of the first electrode. Combinations of the above recited ranges are also possible (e.g., the first coating covers greater than or equal to 10% and less than or equal to 99.9% of the surface area of the first electrode, the first coating covers greater than or equal to 40% and less than or equal to 60% of the surface area of the first electrode). Other ranges are also possible.

According to some embodiments, first coating 16 may have any of a variety of suitable morphologies. In certain embodiments, for example, the first coating may be at least partially crystalline, polycrystalline, and/or amorphous. In some embodiments, the first coating may be porous, for example, first coating 16 may comprise a plurality of pores. The term "pore" is given its ordinary meaning in the art and generally refers to a conduit, void, or passageway, at least a portion of which is surrounded by a medium in which the pore is formed, such that a continuous loop may be drawn around the pore while remaining within the medium. The pores of the first coating may comprise any suitable cross-sectional shape, such as, for example, circular, elliptical, polygonal (e.g., rectangular, triangular, etc.), irregular, and the like. The porous morphology of the first coating advantageously provides a highly-externally accessible surface area that may be contacted by a fluid source and/or a pathway for facile diffusion of a target molecule, as is described herein in further detail. Methods of determining the morphology of the first coating include scanning electron microscopy (SEM) and transmission electron microscopy (TEM). Other methods may also be utilized.

Any of a variety of suitable adsorbent polymers may be utilized. In certain embodiments, the adsorbent polymer is electrically conductive. Advantageously, an electrically conductive adsorbent polymer allows electrical conductivity to be passed through at least a portion of the adsorbent polymer in order to oxidize and/or reduce the adsorbent polymer such that it adsorb and/or desorb the target molecule, as is explained herein in greater detail. In some embodiments, example, the adsorbent polymer comprises polypyrrole, polyaniline, polythiophene, and/or their derivatives. Other adsorbent polymers are also possible.

The first coating may comprise the adsorbent polymer in any of a variety of suitable amounts. In certain embodiments, for example, the first coating comprises the adsorbent polymer in an amount greater than or equal to 20 wt. %, greater than or equal to 30 wt. %, greater than or equal to 40 wt. %, greater than or equal to 50 wt. %, greater than or equal to 60 wt. %, or greater than or equal to 70 wt. % by mass based on the total weight of the first coating. In some embodiments, the first coating comprises the adsorbent polymer in an amount less than or equal to 80 wt. %, less than or equal to 70 wt. %, less than or equal to 60 wt. %, less than or equal to 50 wt. %, less than or equal to 40 wt. %, or less than or equal to 30 wt. % by mass based on the total weight of the first coating. Combinations of the above recited ranges are also possible (e.g., the first coating comprises the adsorbent polymer in an amount greater than or equal to 20 wt. % and less than or equal to 80 wt. % by mass based on the total weight of the first coating, the first coating comprises the adsorbent polymer in an amount greater than or equal to 40 wt. % and less than or equal to 60 wt. % by mass based on the total weight of the second coating). Other ranges are also possible.

Any of a variety of suitable redox-active polymers may be utilized. In some embodiments, for example, the redox-active polymer comprises an organometallic compound or polymer and/or an organic compound or polymer. An organometallic compound is generally a compound comprising at least one metal carbon (M-C) bond where the carbon is part of an organic group. Examples of such organic groups include, but are not limited to, alkyl (e.g., methyl), alkylidene (e.g., carbene), alkenyl (e.g., vinyl), allyl (e.g., —$C_3H_5$), alkylidyne (e.g., carbyne), 1,3-butadienyl (e.g., —$C_4H_5$), cyclobutadienyl (e.g., —$C_4H_3$), cyclopentadienyl (—$C_5H_5$), aryl (e.g., phenyl, naphthyl), and cyclooctatetraenyl (e.g., —$C_8H_7$). The metal in the metal-carbon (M-C) bond of organometallic compounds can include, in accordance with certain embodiments, metals (e.g., Li, Mg, and Al), metalloids, and transition metals (e.g., Fe, Co, Cr, and Ni). Organometallic compounds include, among others, metallocenes, polymers and derivatives, metal-bipyiridine systems, ferricyanide type systems, porphyrins, phthalocyanines, and pincer-ligand metal systems. An organometallic polymer is a polymer comprising an organometallic compound (e.g., a polymer comprising metallocene).

In some embodiments, the redox-active polymer comprises a polymetallocene (e.g., polyferrocene, polycobaltocene, and the like) or a polymetallocene-based redox-active polymer. In certain non-limiting embodiments, the redox-active polymer comprises polyvinylferrocene.

Additional non-limiting examples of redox-active polymer include polymeric redox-systems (e.g., polyaniline-type systems, polypyrrole, polythiophene, and their derivatives); crystalline solids (e.g., redox-active metal based nanoparticles, redox-active heteropolyacids, redox-active metal-organic frameworks, redox-active crystalline polymer frameworks such as covalent-organic frameworks; cyclodextrin-based systems, metal-polypyridyl systems, metal-dicarbamates, cryptands, redox-active arenes, dendrimers comprising redox-active centers, and redox-active organic macrocycles. Other redox-active polymers are also possible.

The first coating may comprise the redox-active polymer in any of a variety of suitable amounts. In certain embodiments, for example, the first coating comprises the redox-active polymer in an amount greater than or equal to 20 wt. %, greater than or equal to 30 wt. %, greater than or equal to 40 wt. %, greater than or equal to 50 wt. %, greater than or equal to 60 wt. %, or greater than or equal to 70 wt. % by mass based on the total weight of the first coating. In some embodiments, the first coating comprises the redox-active polymer in an amount less than or equal to 80 wt. %, less than or equal to 70 wt. %, less than or equal to 60 wt. %, less than or equal to 50 wt. %, less than or equal to 40 wt. %, or less than or equal to 30 wt. % by mass based on the total weight of the first coating. Combinations of the above recited ranges are also possible (e.g., the first coating comprises the redox-active polymer in an amount greater than or equal to 20 wt. % and less than or equal to 80 wt. % by mass based on the total weight of the first coating, the first coating comprises the redox-active polymer in an amount greater than or equal to 40 wt. % and less than or equal to 60 wt. % by mass based on the total weight of the second coating). Other ranges are also possible.

In some embodiments, second coating 22 comprises an adsorbent polymer (e.g., a second adsorbent polymer) and a surfactant. As is explained in greater detail below, the surfactant may be provided, in some embodiments, as an amphiphilic (e.g., at least partially hydrophobic and at least partially hydrophilic) ionic salt. In some such embodiments, the surfactant dopes the adsorbent polymer. For example, in certain embodiments, the second coating may comprise a cationic adsorbent polymer doped with an anionic surfactant (thereby yielding an overall neutral species). In some such embodiments, the positively charged adsorbent polymer attracts one or more negatively charged portions (e.g., hydrophilic heads) of the surfactant such that one or more hydrophobic portions (e.g., hydrophobic tails) of the of surfactant face a direction away from the cationic adsorbent polymer. Resultantly, in certain embodiments, the second coating renders at least a portion of the second electrode hydrophobic. In certain embodiments, for example, at least a portion of the second coating has a water contact angle greater than 90° (e.g., greater than or equal to 100°, greater than or equal to 120°, greater than or equal to 140°, greater than or equal to 160°, or greater).

Second coating 22 may be disposed on at least a portion of second electrode 18 utilizing any of a variety of suitable techniques. In certain embodiments, for example, the second coating is disposed on the second electrode by electropolymerization. Other deposition methods may be utilized, in some embodiments, such as, but not limited to, chemical vapor deposition (CVD), plasma enhanced CVD (PECVD), atomic layer deposition (ALD), and/or molecular layer deposition (MLD).

Second coating 22 may covers any of a variety of suitable surface areas of second electrode 18. In some embodiments, for example, the second coating covers greater than or equal to 10%, greater than or equal to 20%, greater than or equal to 30%, greater than or equal to 40%, greater than or equal to 50%, greater than or equal to 60%, greater than or equal to 70%, greater than or equal to 80%, greater than or equal to 90%, or greater than or equal to 99% of the surface area of the second electrode. In certain embodiments, the second coating covers less than or equal to 99.9%, less than or equal to 99%, less than or equal to 90%, less than or equal to 80%, less than or equal to 70%, less than or equal to 60%, less than or equal to 50%, less than or equal to 40%, less than or equal to 30%, or less than or equal to 20% of the surface area of the second electrode. Combinations of the above recited ranges are also possible (e.g., the second coating covers greater than or equal to 10% and less than or equal to 99.9% of the surface area of the second electrode, the second coating covers greater than or equal to 40% and less than or equal to 60% of the surface area of the second electrode). Other ranges are also possible.

According to some embodiments, second coating 22 have any of a variety of suitable morphologies. In certain embodiments, for example, the second coating may be at least partially crystalline, polycrystalline, and/or amorphous. In some embodiments, the second coating may be porous, for example, second coating 22 may comprise a plurality of pores. The pores of the second coating may comprise any suitable cross-sectional shape, such as, for example, circular, elliptical, polygonal (e.g., rectangular, triangular, etc.), irregular, and the like. The porous morphology of the second coating advantageously provides a highly-externally accessible surface area that may be contacted by a fluid source and/or a pathway for facile diffusion of a target molecule, as is described herein in further detail. Methods of determining the morphology of the second coating include scanning electron microscopy (SEM) and transmission electron microscopy (TEM). Other methods may also be utilized.

Any of the aforementioned adsorbent polymers may be utilized as the second adsorbent polymer. In certain embodiments, the first adsorbent polymer and the second adsorbent polymer may be the same (e.g., the first adsorbent polymer and the second adsorbent polymer both comprise polypyrrole). In some other embodiments, the first adsorbent polymer and the second adsorbent polymer may be different (e.g., the first adsorbent polymer comprises polypyrrole and the second adsorbent polymer comprises polyaniline, the first adsorbent polymer comprises polyaniline and the second adsorbent polymer comprises polypyrrole.

The second coating may comprise the adsorbent polymer in any of a variety of suitable amounts. In certain embodiments, for example, the second coating comprises the adsorbent polymer in an amount greater than or equal to 20 wt. %, greater than or equal to 30 wt. %, greater than or equal to 40 wt. %, greater than or equal to 50 wt. %, or greater than or equal to 60 wt. %, or greater than or equal to 70 wt. % by mass based on the total weight of the second coating. In some embodiments, the second coating comprises the adsorbent polymer in an amount less than or equal to 80 wt. %, less than or equal to 70 wt. %, less than or equal to 60 wt. %, less than or equal to 50 wt. %, less than or equal to 40 wt. %, or less than or equal to 30 wt. % by mass based on the total weight of the second coating. Combinations of the above recited ranges are also possible (e.g., the second coating comprises the adsorbent polymer in an amount greater than or equal to 20 wt. % and less than or equal to 80 wt. % by mass based on the total weight of the second coating, the second coating comprises the adsorbent polymer in an amount greater than or equal to 40 wt. % and less than or equal to 60 wt. % by mass based on the total weight of the second coating). Other ranges are also possible.

Any of a variety of suitable surfactants may be utilized. The surfactant may be a detergent, wetting agent, emulsifier, foaming agent, and/or dispersant, in certain embodiments. According to some embodiments, the surfactant is an amphiphilic anionic surfactant comprises a negatively charged, hydrophilic head and a hydrophobic tail. The surfactant may be a sulfate, a sulfonate, and/or a gluconate, in some embodiments. In certain embodiments, the surfactant comprises 2-acrylamido-2-methylpropane sulfonic acid, alkylbenzene sulfonates, ammonium lauryl sulfate, ammonium perfluorononanoate, chlorosulfolipid, docusate, disodium cocoamphodiacetate, magnesium laureth sulfate, perfluorobutanesulfonic acid, perfluorodecanoic acid, perfluorononanoic acid, perfluorooctanesulfonic acid, perfluorooctanoic acid, phospholipid, potassium lauryl sulfate, sodium alkyl sulfate, sodium dodecyl sulfate, sodium laurate, sodium laureth sulfate, sodium lauroyl sarcosinate, sodium myreth sulfate, sodium nonanoyloxybenzenesulfonate, sodium pareth sulfate, sodium stearate, sodium sulfosuccinate esters, and/or sulfolipid. In some embodiments, the surfactant comprises dioctyl sulfosuccinate (e.g., sodium or potassium salt) and/or dodecylbenzenesulfonate (e.g., sodium or potassium salt). Other surfactants are also possible.

The second coating may comprise the surfactant in any of a variety of suitable amounts. In certain embodiments, for example, the second coating comprises the surfactant in an amount greater than or equal to 20 wt. %, greater than or equal to 30 wt. %, greater than or equal to 40 wt. %, greater than or equal to 50 wt. %, greater than or equal to 60 wt. %, or greater than or equal to 70 wt. % by mass based on the total weight of the second coating. In some embodiments, the second coating comprises the surfactant in an amount less than or equal to 80 wt. %, less than or equal to 70 wt. %, less than or equal to 60 wt. %, less than or equal to 50 wt. %, less than or equal to 40 wt. %, or less than or equal to 30 wt. % by mass based on the total weight of the second coating. Combinations of the above recited ranges are also possible (e.g., the second coating comprises the surfactant in an amount greater than or equal to 20 wt. % and less than or equal to 80 wt. % by mass based on the total weight of the second coating, the second coating comprises the surfactant in an amount greater than or equal to 40 wt. % and less than or equal to 60 wt. % by mass based on the total weight of the second coating). Other ranges are also possible.

The electrochemical cell may comprise the first electrode and the second electrode in any of a variety of suitable mass loading ratios. Employing an optimal mass loading ratio may advantageously provide substantially equally capacitances between the two electrodes. In certain embodiments, the electrochemical cell comprises the first electrode and the second electrode in a mass loading ratio of greater than or equal to 0.1:1, greater than or equal to 0.5:1, greater than or equal to 1:1, greater than or equal to 1.5:1, greater than or equal to 2:1, greater than or equal to 2.5:1, or greater than or equal to 3:1. In some embodiments, the electrochemical cell comprises the first electrode and the second electrode in a mass loading ratio of less than or equal to 5:1, less than or equal to 3:1, less than or equal to 2.5:1, less than or equal to 2:1, less than or equal to 1.5:1, less than or equal to 1:1, or less than or equal to 0.5:1. Combinations of the above recited ranges are also possible (e.g., the electrochemical cell comprises the first electrode and the second electrode in a mass loading ratio of greater than or equal to 0.1:1 and less than or equal to 3:1, the electrochemical cell comprises the first electrode and the second electrode in a mass loading ratio of greater than or equal to 1.5:1 and less than or equal to 2.5:1). Other ranges are also possible. As would be understood by a person of ordinary skill in the art, the mass loading ratio depends on the overall molecular weights of the first coating and/or the second coating and/or on the relative amounts of the different components used to form the first coating and/or the second coating.

Figure 1B:
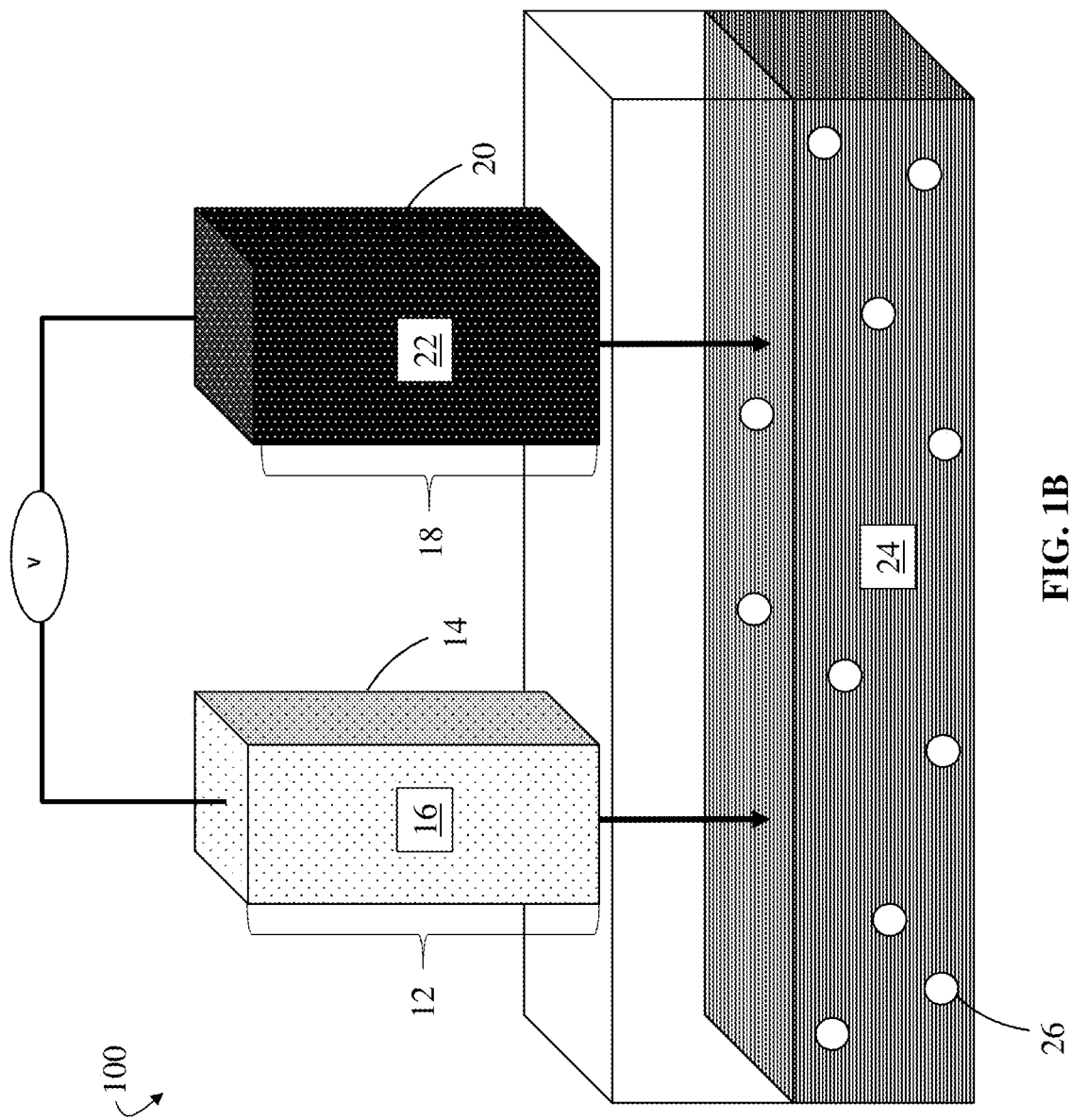
FIGS. 1B-1C show, according to certain embodiments, schematic diagrams representing a method of separating a target molecule from a fluid source.
Figure 1C:
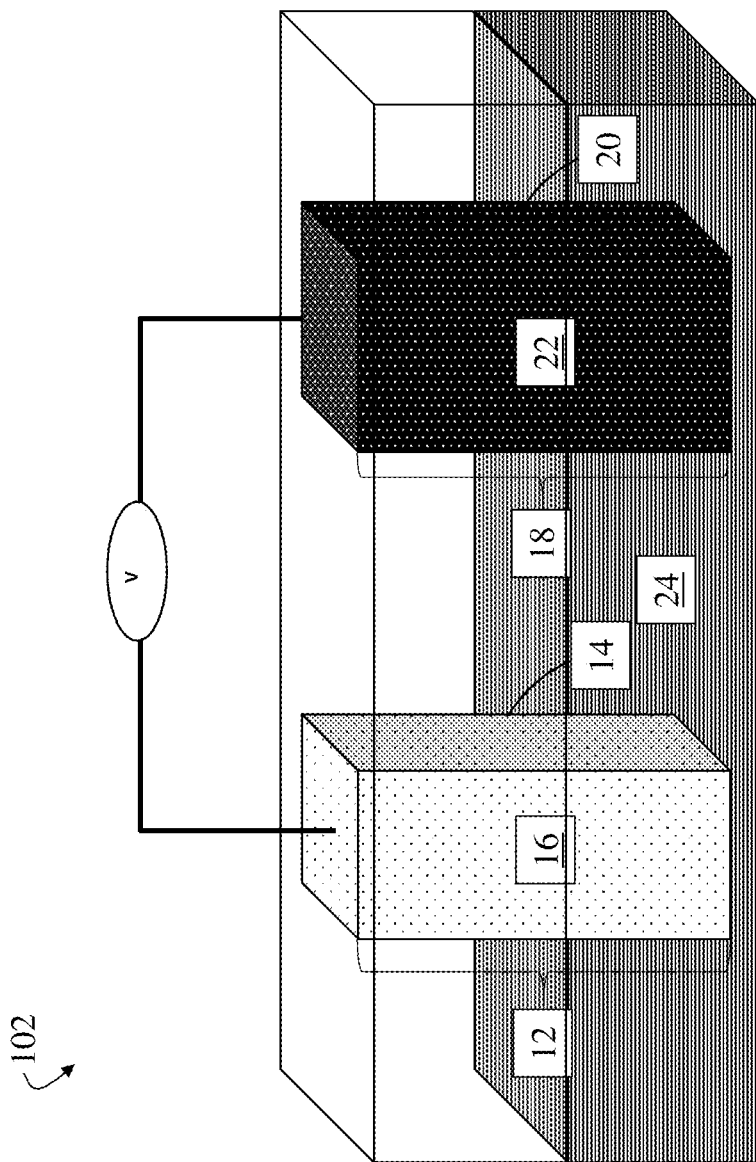

According to certain embodiments, a method of separating a target molecule from a fluid source is described. FIGS. 1B-1C show, according to certain embodiments, schematic diagrams representing a method of separating a target molecule from a fluid source. As shown in FIG. 1B, the method may comprise step 100, which comprises placing first electrode 12 and second electrode 18 into fluid source 24 comprising target molecule 26. The first electrode and/or the second electrode may be partially or completely submerged in the fluid source.

Referring to FIG. 1C, the method may comprise, in certain embodiments, step 102, which comprises allowing first electrode 12 and/or second electrode 18 to adsorb target molecule 26 from fluid source 24. As explained above, the first coating on the first electrode and the second coating on the second electrode render at least a portion of the first electrode and the second electrode hydrophobic, in some embodiments. Advantageously, the hydrophobic electrodes therefore repel water and adsorb the target molecule from the fluid source without costing energy (e.g., without applying an electrical potential).

In certain embodiments, an optional electrical potential is applied to further render the first electrode and the second electrode hydrophobic by, for example, reducing at least a portion of the first coating and oxidizing at least a portion of the second coating, which is explained herein in greater detail. In certain embodiments, for example, the applied electrical potential is less than the redox potential of the electrochemical cell as assessed by cyclic voltammetry. Such an electrical potential may, for example in certain non-limiting embodiments, be between greater than or equal to 0.0 and less than or equal to 0.3 V (vs. Ag/AgCl reference electrode).

First electrode 12 and/or second electrode 18 may be allowed to adsorb target molecule 26 from fluid source 24 for any of a variety of suitable times. In certain embodiments, for example, the first coating (e.g., comprising the first adsorbent polymer and the redox-active species), the second coating (e.g., comprising the second adsorbent polymer and the surfactant), and the target molecule are allowed to reach chemical equilibrium such that the first adsorbent polymer and/or the second adsorbent polymer are not able to adsorb more of the target molecule without the application of energy.

In certain embodiments, the first electrode and/or the second electrode may be allowed to adsorb the target molecule for greater than or equal to 10 minutes, greater than or equal to 1 hour, greater than or equal to 5 hours, greater than or equal to 10 hours, greater than or equal to 15 hours, or greater than or equal to 20 hours. In some embodiments, the first electrode and/or the second electrode are allowed to adsorb the target molecule for less than or equal to 30 hours, less than or equal to 20 hours, less than or equal to 15 hours, less than or equal to 10 hours, less than or equal to 5 hours, or less than or equal to 1 hour. Combinations of the above recited ranges are also possible (e.g., the first electrode and/or the second electrode may be allowed to adsorb the target molecule for greater than or equal to 10 minutes and less than or equal to 30 hours, the first electrode and/or the second electrode may be allowed to adsorb the target molecule for greater than or equal to 5 hours and less than or equal to 15 minutes).

Any of a variety of suitable target molecules may be utilized. In some embodiments, the target molecule comprises an organic compound. For example, in certain embodiments, the organic compound comprises a neutral organic compound. In some embodiments, the target molecule comprises a dissolved organic compound. In some embodiments, the target molecule comprises a dissolved neutral organic compound. Examples of organic compounds include pharmaceuticals, dyes, pesticides, herbicides, personal care products (e.g., cosmetics), tobacco extracts, other commodity or specialty chemicals, and/or by-products thereof.

In certain non-limiting embodiments, the target molecule comprises Sudan Orange G, which is a dye commonly used in the textile industry and one of the primary sources or water contamination worldwide. In certain embodiments, the target molecule comprises 2,4-dichlorophenol, propranolol hydrochloride, 1-napththol, 2-napththol, and/or 1-naphthylamine, which are known carcinogenic pollutants and intermediates for herbicide manufacturing and synthesis of industrial dyes. In certain embodiments, the target molecules comprises bisphenol A and/or bisphenol S, which are anthropogenic pollutants that appear to be endocrine disruptors with long-term environmental persistence. In some embodiments, the target molecule comprises metolachlor, which is considered to be one of the leading pesticides responsible for groundwater contamination. In certain embodiments, the target molecule comprises ethinyl estradiol and/or propranolol hydrochloride, which are widely used pharmaceuticals, with the former being a common contraceptive that has led to the collapse of fish populations and the latter being a beta-blocker for treatment of hypertension. In some embodiments, the target molecule comprises methyl orange and/or rhodamine B, which are common industrial dyes identified as municipal water contaminants in developing countries. Other target molecules are also be possible.

The fluid source may comprise a mixture of organic compounds (e.g., dissolved organic compounds), and the asymmetric system described herein may be utilized to selectively adsorb one organic compound from the mixture of organic compounds. For example, in certain non-limiting embodiments, the asymmetric system may be configured to adsorb one organic compound (e.g., propranolol hydrochloride) without adsorbing a second organic compound (e.g., 1-naphthol), therefore providing an ability to remove impurities during the synthesis of commercial products (e.g., pharmaceuticals, herbicides, pesticides, personal care chemicals, specialty chemicals, dyes, and the like).

Any of a variety of suitable fluid sources may be utilized. In some embodiments, for example, the fluid source comprises an aqueous solution, an organic solvent (e.g., acetonitrile), and/or an ionic liquid.

Figure 1D:
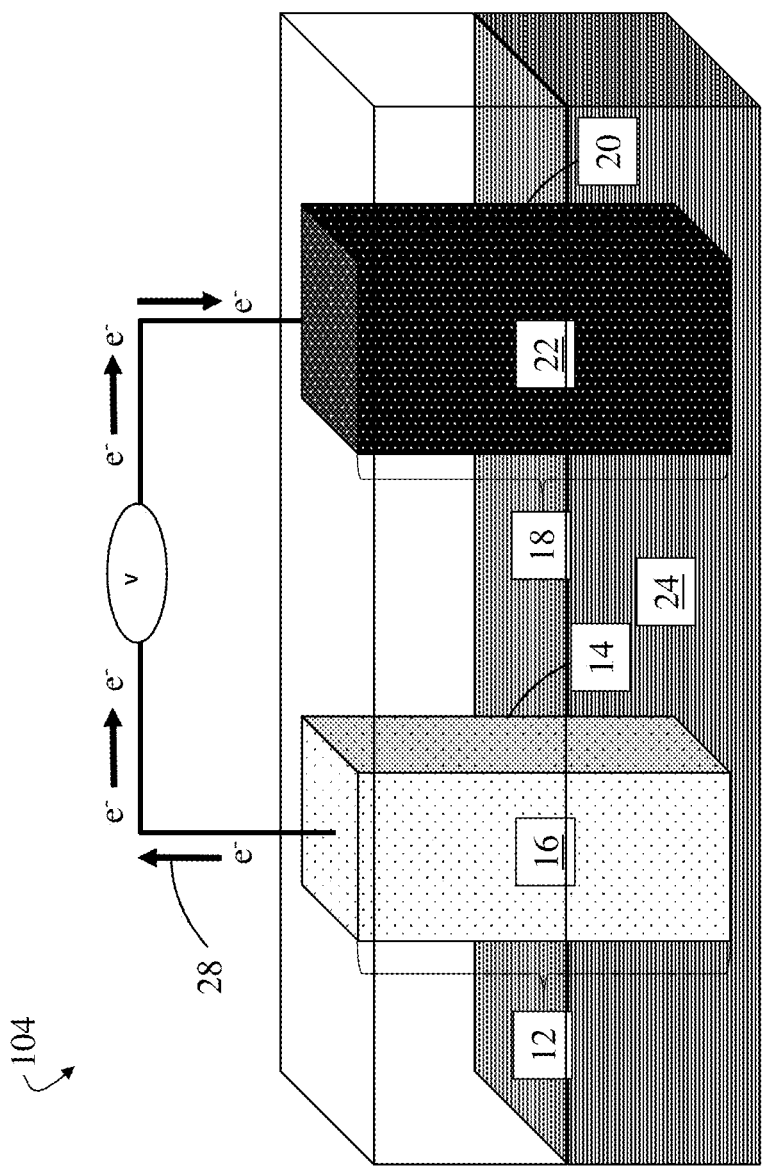
FIGS. 1D-1E show, according to certain embodiments, schematic diagrams representing a method of desorbing a target molecule into a fluid source.
Figure 1E:
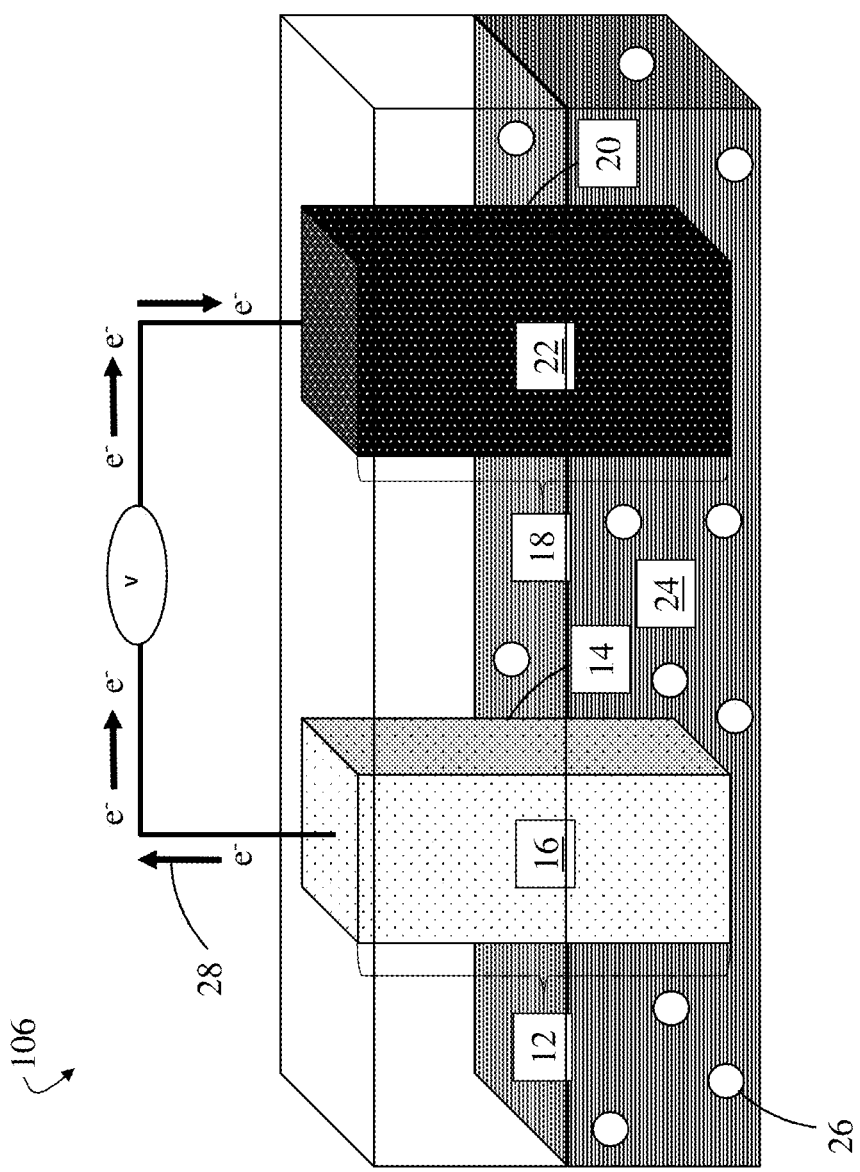

According to certain embodiments, a method of desorbing a target molecule into a fluid source is described. FIGS. 1D-1E show, according to certain embodiments, schematic diagrams representing a method of desorbing a target molecule into a fluid source. Referring to FIG. 1D, the method may comprise, in certain embodiments, applying electrical potential 28 (e.g. first electrical potential) to an electrochemical cell, wherein the electrochemical cell comprises first electrode 12 and second electrode 18 placed in fluid source 24. In some embodiments, first electrode 12 and/or second electrode 18 further comprise a target molecule adsorbed by the first adsorbent polymer and/or the second adsorbent polymer, respectively, as is explained above.

In certain embodiments, applying electrical potential 28 (e.g., first electrical potential) to the electrochemical cell oxidizes at least a portion of first coating 16. For example, according to some embodiments, at least a portion of the first coating may be oxidized such that the first coating comprises a mixture of a positively charged (e.g., cationic) adsorbent polymer and/or a positively charged (e.g., cationic) redox-active species. Therefore, in some embodiments, applying the electrical potential (e.g., first electrical potential) to the electrochemical cell renders at least a portion of the first electrode hydrophilic. As used herein, the term "hydrophilic" is given its ordinary meaning in the art and generally refers to a material that tends to attract or mix with water. In certain embodiments, for example, at least a portion of the oxidized first coating has a water contact angle less than 90° (e.g., less than or equal to 80°, less than or equal to 60°, less than or equal to 40°, less than or equal to 20°, or less). Advantageously, rendering at least a portion of first coating hydrophilic allows water molecules in the fluid source to more favorably interact with the oxidized first coating (e.g., the positively charged adsorbent polymer and/or the positively charged redox-active species), thereby displacing the target molecule that was previously adsorbed by the first coating.

In some embodiments, applying electrical potential 28 to the electrochemical cell reduces at least a portion of second coating 22. For example, according to some embodiments, at least a portion of the second coating may be reduced such that the coating comprises a neutral adsorbent polymer doped with a negatively charged (e.g., anionic) surfactant. As a result, the negatively charged anionic surfactant reorients itself, in some embodiments, such that one or more hydrophobic portions (e.g., hydrophobic tails) of the surfactant move closer to the adsorbent polymer and one or more negatively charged portions (e.g., hydrophilic heads) of the surfactant face a direction away from the neutral adsorbent polymer. In some embodiments, applying the electrical potential (e.g., first electrical potential) to the electrochemical cell renders at least a portion of the second coating hydrophilic. In certain embodiments, for example, at least a portion of the reduced second coating has a water contact angle less than 90° (e.g., less than or equal to 80°, less than or equal to 60°, less than or equal to 40°, less than or equal to 20°, or less). Advantageously, rendering at least a portion of second coating hydrophilic allows water molecules in the fluid source to more favorably interact with the reduced second coating (e.g., the neutral adsorbent polymer and/or the negatively charged surfactant), thereby displacing the target molecule that was previously adsorbed by the second coating.

The applied electrical potential (e.g., the first electrical potential) may be any of a variety of suitable potentials. In certain embodiments, for example, the applied electrical potential is greater than the redox potential of the electrochemical cell as assessed by cyclic voltammetry. Such an electrical potential may, for example in certain non-limiting embodiments, be between greater than or equal to 0.9 and less than or equal to 1.2 V (vs. Ag/AgCl reference electrode). The electrical potential (e.g., first electrical potential) may be applied for between greater than or equal to 1 minute and less than or equal to 1 hour.

Referring to FIG. 1E, the method may comprise step 106, which comprises allowing first electrode 12 and/or second electrode 18 to desorb target molecule 26 into fluid source 24. The target molecule may desorb from the first electrode (e.g., the first coating) and/or the second electrode (e.g., the second coating) while the electrical potential (e.g., first electrical potential) is applied to the electrochemical cell.

In certain embodiments, it may be beneficial to remove the asymmetric system from the fluid source after absorbing the target molecule, followed by placing the asymmetric system in a second fluid source that is different from the first fluid source in order to desorb the target molecule (e.g., in order to dispose of the target molecule in a different fluid source than the source of the target molecule).

Figure 1F:
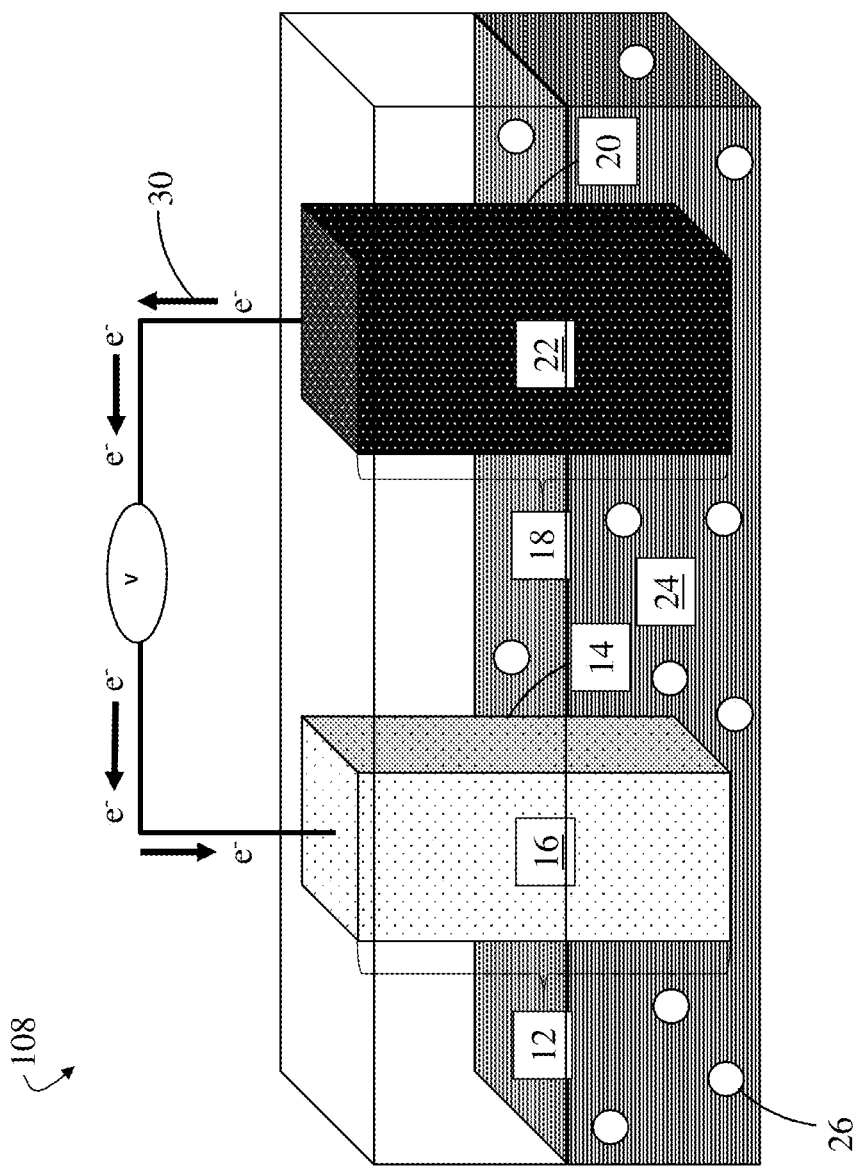
FIGS. 1F-1G show, according to certain embodiments, schematic diagrams representing a method of regenerating an asymmetric cell and separating a target molecule from a fluid source.
Figure 1G:
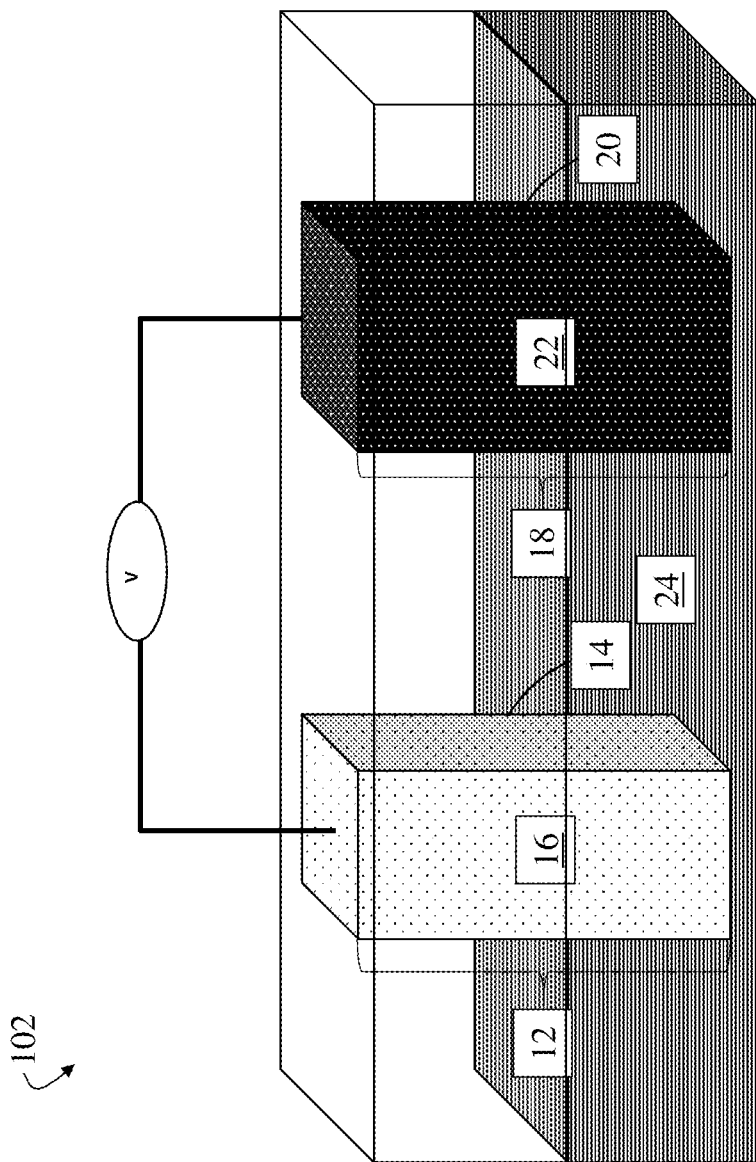

According to some embodiments, a method of regenerating the first coating and/or the second coating is described. FIGS. 1F-1G show, according to certain embodiments, schematic diagrams representing a method of regenerating an asymmetric cell and separating a target molecule from a fluid source. Referring to FIG. 1F, the method comprises step 108, which comprises applying second electrical potential 30 to the electrochemical cell.

In certain embodiments, applying second electrical potential 30 to the electrochemical cell reduces at least a portion of first coating 16. For example, according to some embodiments, at least a portion of the first coating may be reduced such that the first coating comprises a mixture of a neutral adsorbent polymer and/or a neutral redox-active species, therefore resulting in a regenerated (e.g., oxidized) first coating). In some embodiments, applying the second electrical potential to the electrochemical cell renders at least a portion of the first electrode hydrophobic.

In some embodiments, applying second electrical potential 20 to the electrochemical cell oxidizes at least a portion of second coating 22. For example, according to some embodiments, at least a portion of the second coating may be oxidized such that the second coating comprises a positively charged (e.g., cationic) adsorbent polymer doped with a negatively charged (e.g., anionic surfactant). As a result, the negatively charged anionic surfactant reorients itself, in some embodiments, such that one or more negatively charged portions (e.g., hydrophilic heads) of the surfactant move closer to the adsorbent polymer and one or more hydrophobic portions (e.g., hydrophobic tails) of the surfactant face a direction away from the neutral adsorbent polymer, therefore resulting in a regenerated (e.g., oxidized) second coating. In some embodiments, applying the second electrical potential to the electrochemical cell renders at least a portion of the second electrode hydrophobic.

The applied second electrical potential may be any of a variety of suitable potentials. In certain embodiments, for example, the applied second electrical potential is less than the redox potential of the electrochemical cell as assessed by cyclic voltammetry. Such an electrical potential may, for example in certain non-limiting embodiments, be between greater than or equal to 0.0 and less than or equal to 0.3 V (vs. Ag/AgCl reference electrode). The second electrical potential (e.g., first electrical potential) may be applied for between greater than or equal to 1 minute and less than or equal to 1 hour.

As shown in FIG. 1G, after applying the second electrical potential to the electrochemical cell to render at least a portion of the first electrode and/or the second electrode hydrophobic, the method may again comprise step 102, which comprises allowing first electrode 12 and/or second electrode 18 to adsorb target molecule 26 from fluid source 24. The cycle of adsorbing (e.g., step 102 in FIG. 1C), desorbing (e.g., step 106 in FIG. 1E), and regenerating (e.g., step 108 in FIG. 1F) may be performed any of a variety of suitable times. In certain embodiments, for example, the asymmetric system may be subjected to one or more cycles, two or more cycles, three or more cycles, four or more cycles, five or more cycles, ten or more cycles, twenty or more cycles, thirty or more cycles, forty or more cycles, or fifty or more cycles.

According to some embodiments, a system is described, wherein the system comprises an electrochemical cell as described herein. The electrochemical cell may be disposed as a portion of a system used to purify water. In certain embodiments, for example, the electrochemical cell is disposed as a portion of a filter.

In certain embodiments, the electrochemical cell may comprise any of a variety of suitable additional components. For example, according to some embodiments, the electrochemical cell comprises an electrolyte. The electrolytes used in electrochemical cells can function as a medium for the storage and transport of ions. Any of a variety of suitable liquids, solids, or gel materials capable of storing and transporting ions may be used, so long as the material facilitates the transport of ions between one or more electrodes (e.g., an anode and a cathode). The electrolyte is generally electronically non-conductive to prevent short circuiting between the anode and the cathode. The electrolyte can comprise one or more ionic electrolyte salts to provide ionic conductivity and one or more liquid electrolyte solvents, gel polymer materials, or polymer materials. In some embodiments, for example, the electrolyte is an electrolyte solution comprising, for example, an ionic salt dissolved in a fluid source In some embodiments, the electrochemical cell comprises a separator. The separator generally comprises a polymeric material (e.g., polymeric material that does or does not swell upon exposure to electrolyte). In certain embodiments, the separator is located between the first electrode and the second electrode. The separator may be configured to inhibit (e.g., prevent) physical contact between a first electrode and a second electrode, which could result in short circuiting of the electrochemical cell. The separator may be configured to be substantially electronically non-conductive, which can inhibit the degree to which the separator causes short circuiting of the electrochemical cell.

Example

The following example describes an asymmetric electrochemical cell for the selective adsorption and desorption of organic compounds.

Mass separation agents were immobilized on electrically conductive substrates to form adsorbents responsive to electrochemical modulations. The benefits of such a system are two-fold: first, electrons are transferred directly from the electrodes to the immobilized adsorbents, in contrast to conventional approaches in which complexing agents needed to migrate to be within the vicinity of the electrode for redox reactions to take place; and second, the solid electrodes can be contacted with the feed or receiving phase in a swing process akin to that used in traditional adsorption operations, but with voltage swings rather than changes in temperature, pressure, or solution conditions. Polypyrrole (PPy) was deposited on two carbon substrates as the adsorbent. The carbon substrates were then both modified using a different approach to modulate the hydrophobicity of the PPy, and hence the affinity towards organic solutes in water. The first approach incorporated a redox-responsive polymer, polyvinylferrocene (PVF), in the PPy coating, and in the second approach, PPy was doped with the amphiphilic surfactant dioctyl sulfosuccinate (AOT). The resulting electrodes are referred to herein as PVF-PPy and PPy(AOT), respectively. The synergistic properties of PVF-PPy and PPy(AOT) were evaluated in electrochemically mediated separations of organics by pairing them as opposing electrodes in an asymmetric electrochemical cell.

The tradeoff between energy cost and extent of separation warrants careful choice of electrochemical cell configurations, electrode materials, and process parameters to achieve the most efficient separation. Since PVF-PPy is more hydrophobic when reduced, and hydrophilic when oxidized, while PPy(AOT) behaves in the opposite manner (i.e. is more hydrophilic when reduced, and more hydrophobic when oxidized), the PVF-PPy and PPy(AOT) electrodes form an attractive pair for an asymmetric system to work in tandem. With no voltage applied to the cell, both electrodes are relatively hydrophobic and able to adsorb neutral organic molecules, but when an appropriate electrical potential is applied to the cell to charge both electrodes, the organics will desorb from the loaded electrodes. Reactivation of the two electrodes to prepare them for the next adsorption cycle is spontaneous on simple shorting of the two electrodes. With only the desorption step costing energy, the asymmetric system has the potential to achieve high energetic efficiency. The asymmetric electrode system for capturing organic compounds from water can be used in conjunction with degradation methods, such as electrochemical advanced oxidation processes, to transform toxic organic compounds to less harmful forms or useful compounds.

As discussed in further detail below, it is first experimentally demonstrated that the asymmetric system can be used reversibly to remove model organic species from water, with limited decay in capacity over a number of cycles and an ability to suppress parasitic reactions in water. The energetic efficiency and economic viability of the electrochemically mediated separation of organics is then evaluated relative to conventional adsorption by activated carbons regenerated by thermal desorption or solvent extraction. The generality and selectivity of the PPy-based asymmetric system in the context of a separation that is of direct relevance to pharmaceutical purification is also evaluated.

Figure 2C:
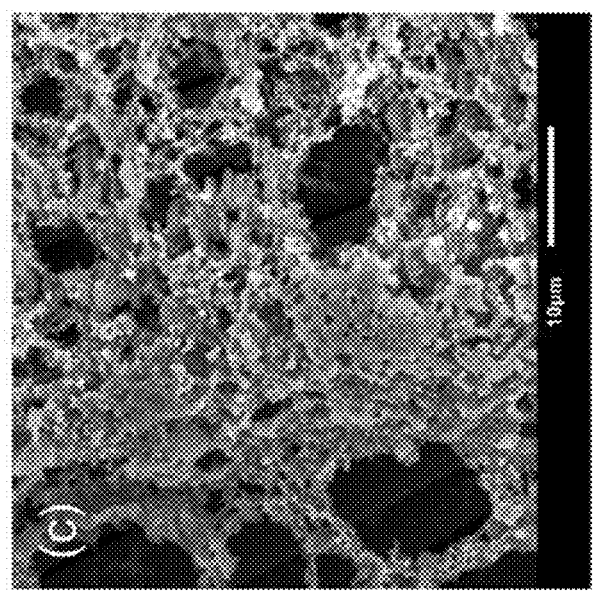
FIG. 2C shows, according to certain embodiments, a SEM image PVF-PPy.
Figure 2B:
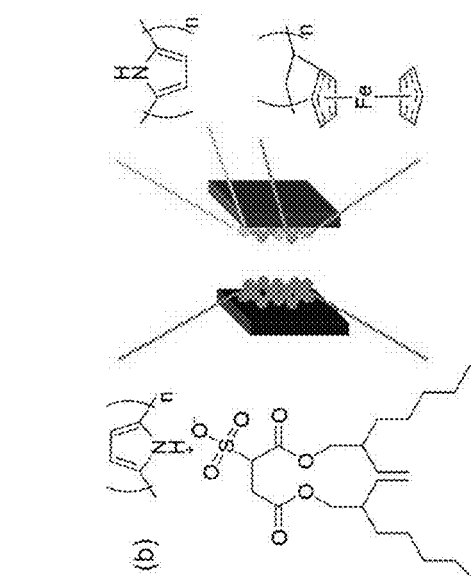
FIG. 2B shows, according to certain embodiments, a schematic diagram representing an asymmetric system comprising a first electrode comprising PPy(AOT) and a second electrode comprising polypyrrole modified with polyvinylferrocene (PVF-PPy)
Figure 2A:
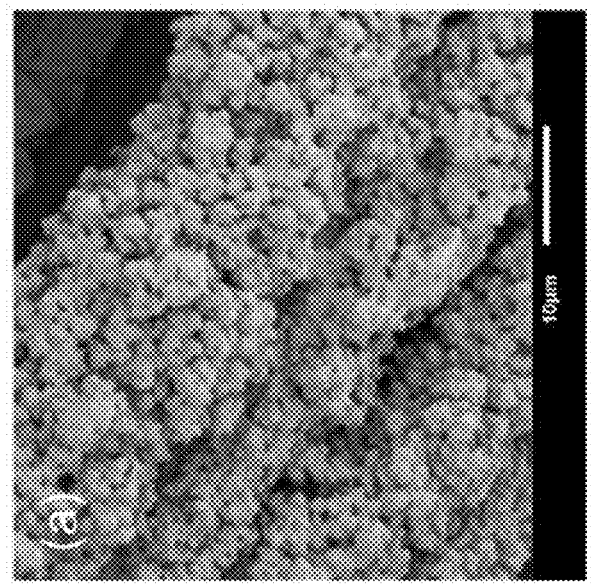
FIG. 2A shows, according to certain embodiments, a scanning electron microscopy (SEM) image of polypyrrole modified with dioctyl sulfosuccinate (PPy(AOT))

The functional materials in an asymmetric system for electrochemically mediated separations should exhibit three properties: (1) electrical conductivity to respond to applied potentials; (2) different affinities towards organic species depending on the applied electrochemical modulation; and (3) high surface area for interactions with organic species to foster a high adsorption capacity. Therefore, polypyrrole, a common intrinsically conducting polymer, was coated on carbon fibers to serve as an underlying conductive network. The polypyrrole was functionalized with either ferrocene moieties or amphiphilic AOT surfactants to modulate the affinities of the materials towards organic species. The PVF-PPy hybrids and doped PPy(AOT) were synthesized using electropolymerization techniques, as is explained in greater detail below. The resulting polymer films coated on commercial carbon cloth substrates possessed highly porous morphology (see FIGS. 2A and 2C). A schematic of an asymmetric system was assembled with a PVF-PPy positive electrode and a PPy(AOT) negative electrode, as shown in FIG. 2B.

Figure 3B:
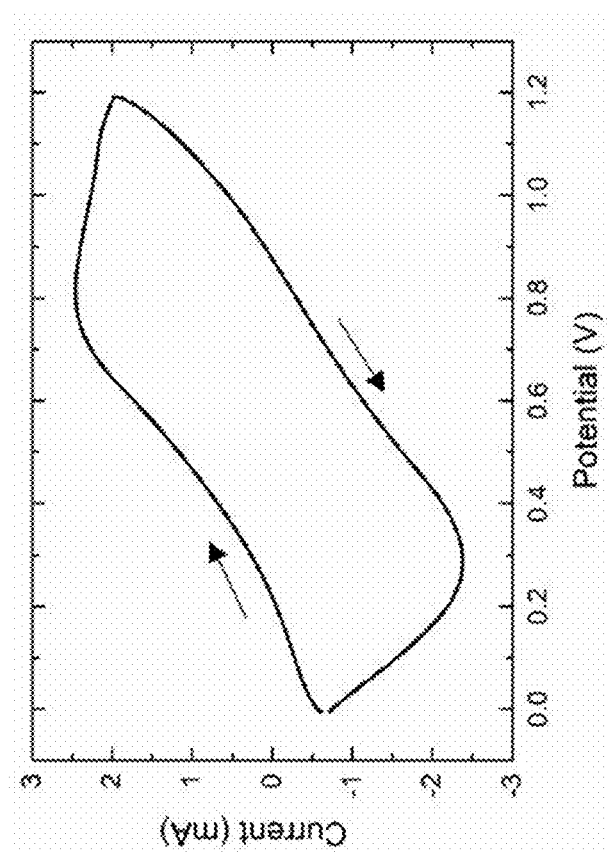
FIG. 3B shows, according to certain embodiments, CVs of the individual electrodes in the asymmetric system.

It is important to balance the charges of the positive and negative electrodes constituting the asymmetric system. One common approach is to adjust the mass of the functional materials on the two electrodes such that the capacitances are equalized. Therefore, the specific capacitances (C) of the PVF-PPy and PPy(AOT) electrodes was estimated using three-electrode cyclic voltammetry (CV) profiles according to equation (1):

$$C = \frac{\int I dV}{2\Delta V m v} \qquad (1)$$

where I is the current (A), $\Delta V$ is the applied potential window (V), m is the mass of the polymer on the electrode, and v is the potential scan rate (V s$^{-1}$). The specific capacitance of PPy(AOT) is approximately twice that of PVF-PPy at low scan rates (49.5 F g$^{-1}$ vs 22.8 F g$^{-1}$). Therefore, we adjusted the electropolymerization reaction times such that the mass loading ratio of the PVF-PPy to PPy(AOT) was approximately 2:1. The electrochemical behavior of the asymmetric system with PVF-PPy and PPy(AOT) electrodes of balanced charges was investigated by cyclic voltammetry (CV) in a two-electrode configuration. The CV responses of the full cell was monitored by setting a potential window of 1.2 V and the responses of the individual electrodes versus a Ag/AgCl reference electrode were recorded (see FIG. 3A). The paired Faradaic reactions on the two electrodes are the oxidation and reduction, respectively, of the ferrocene moieties in PVF-PPy hybrids, and potassium insertion and repulsion accompanied by reorientation of the surfactant dopants in PPy(AOT). The latter happens because the AOT doping anions are largely immobilized within the polymer during the oxidative polymerization due to their size, and hence rely on cation (potassium in this case) exchange with the solution to maintain the electroneutrality of the PPy film during electrochemical modulation. The CV responses of the individual electrodes in the PVF-PPy//PPy(AOT) asymmetric system in a two-electrode configuration were also monitored (see FIG. 3B).

The two adsorbent materials exhibited differences in hydrophobicity depending on the electrochemical signals. For PVF-PPy, when the applied potential (E) is lower than the formal potential of ferrocene ($E^0$=0.34 V vs. Ag/AgCl), the PVF-PPy adsorbent is hydrophobic; most ferrocene moieties are reduced, and organics can be taken up by reduced PVF-PPy. For E>>$E^0$, the PVF-PPy adsorbent becomes relatively hydrophilic; most ferrocene moieties are oxidized and positively charged, and therefore water molecules interact more favorably with the adsorbent and displace neutral organic species previously adsorbed on the polymer. In contrast, for PPy(AOT), when the applied potential (E) is higher than the formal potential of potassium insertion and repulsion ($E^0$=−0.21 V vs. Ag/AgCl), the polymer is hydrophobic, since the positively charged PPy backbone attracts the negatively charged sulfonate groups of AOT such that the hydrophobic tails of the surfactant rearrange to be on the surface of the material. When E<<$E^0$, PPy(AOT) is more hydrophilic as the relatively neutral PPy backbone induces AOT anions to reorient themselves such that the hydrophobic tails move closer to the polymer chains; the sulfonate groups are exposed on the surface.

The Nernst equation (shown below as Equation (2)) describes the impact of applied potential on the relative amounts (R) of the oxidized to reduced moieties on the polymers (i.e., a measure of the relative hydrophilicity of the ferrocene-containing electrodes and of the hydrophobicity of the AOT-doped PPy coating):

$$E = E^0 + \left(\frac{k_B T}{e}\right)\ln(R) \quad (2)$$

where $k_B$ is the Boltzmann constant, T the temperature, and e the elementary charge. Therefore, by adjusting the potential, we can modulate the affinities of the two PPy-based polymers for organics.

Figure 3A:
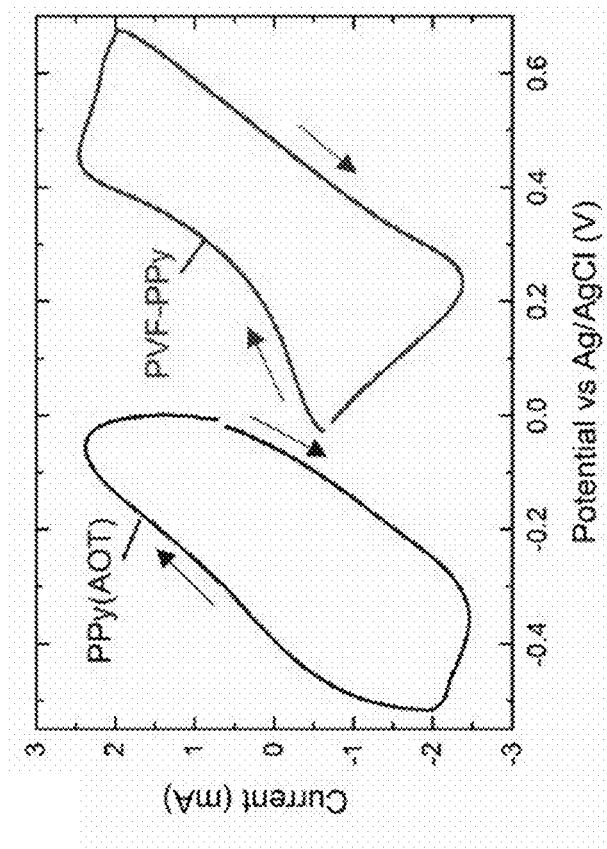
FIG. 3A shows, according to certain embodiments, a cyclic voltammogram (CV) of a full electrochemical cell comprising the asymmetric system.

The CV profile of the full PVF-PPy//PPy(AOT) system shows a pair of redox peaks around 0.55 V (FIG. 3A). This suggests that a potential drop across the two electrodes of greater than 0.55 V should be applied to render both materials hydrophilic to release adsorbed compounds. Subsequently, a potential below 0.55 V can be applied, or the two dual-functionalized electrodes can simply be shorted (0 V) to reoxidize PPy(AOT) and reduce PVF-PPy, thereby reactivating the materials for further adsorption in their hydrophobic states.

Figure 4A:
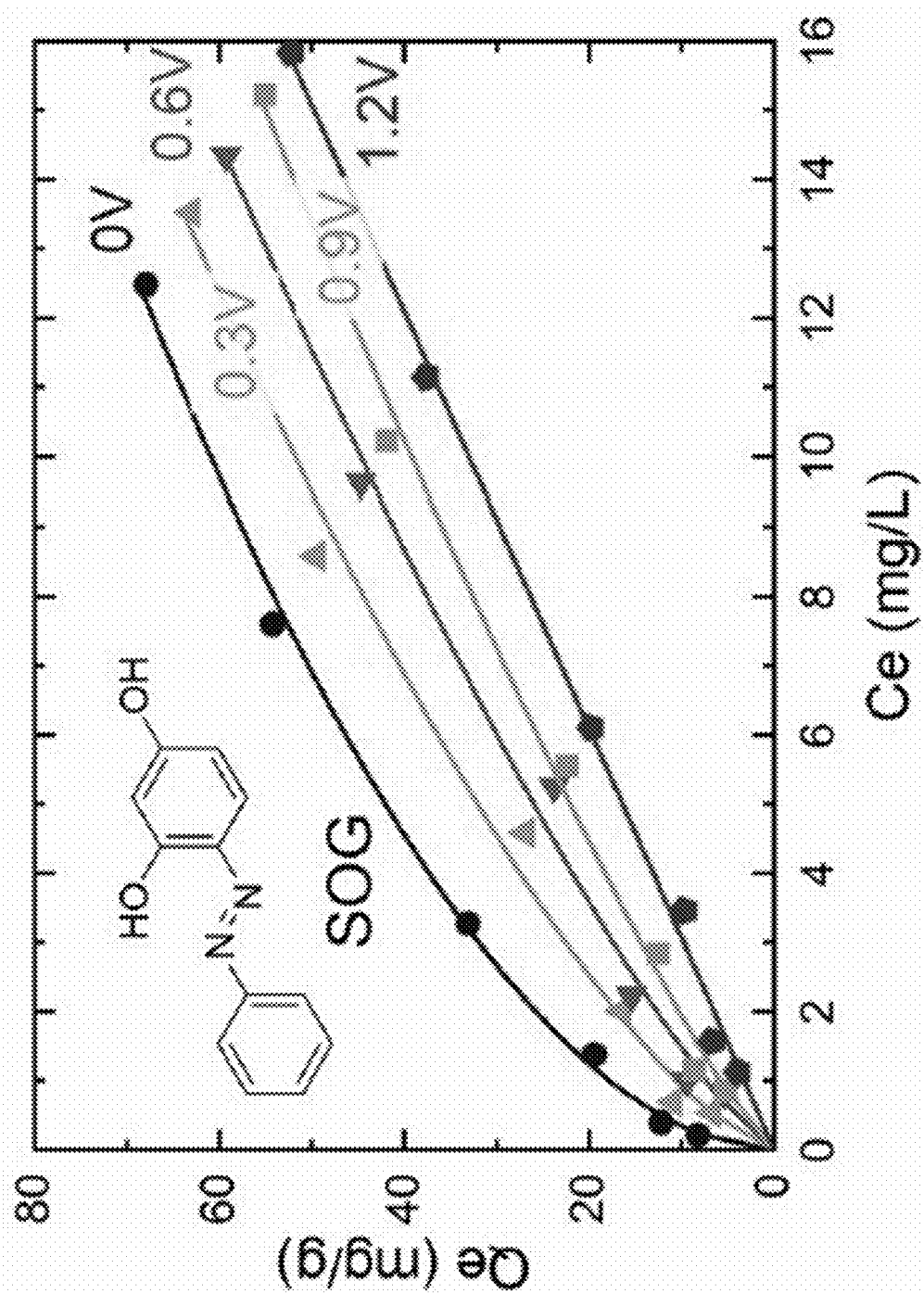
FIG. 4A shows, according to certain embodiments, adsorption isotherms for Sudan Orange G on the asymmetric system modulated by various applied potentials as fitted with the Freundlich equation.

The adsorption capability of the asymmetric system is demonstrated with a common azo dye compound widely used in in the textile industry, Sudan Orange G (SOG), as a model contaminant. The equilibrium adsorption of SOG by the PVF-PPy//PPy(AOT) asymmetric system can be fitted well by the Freundlich adsorption isotherm, shown below in Equation (3):

$$Q_e = k C_e^{1/n} \quad (3)$$

where the Freundlich exponent 1/n, an indication of the extent to which adsorption is favored, increases as 1/n approaches zero (see FIG. 4A). When the asymmetric system is charged at a high potential of 1.2 V, 1/n takes on a value close to unity (1.01), i.e., the isotherm is almost linear, following Henry's Law. For the shorted asymmetric system in which PPy(AOT) is oxidized and PVF-PPy reduced, the fitted 1/n value was 0.54, consistent with the fact that the oxidized PPy(AOT) and reduced PVF-PPy have higher affinities for SOG in their hydrophobic states.

Figure 4B:
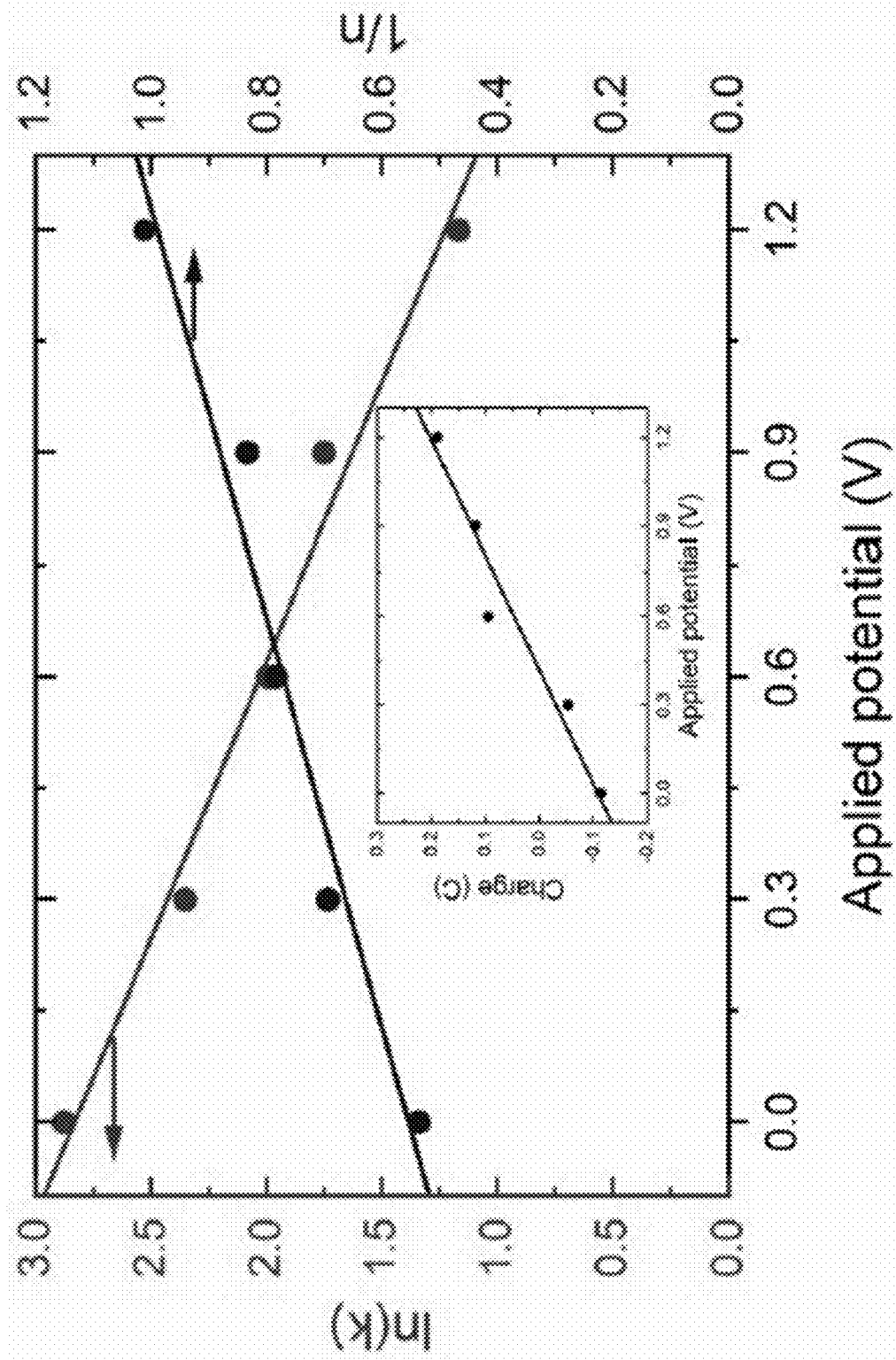
FIG. 4B shows, according to certain embodiments, the linear correlation of the Freundlich parameters ln(k) and 1/n on applied potentials/charges.
Figure 4C:
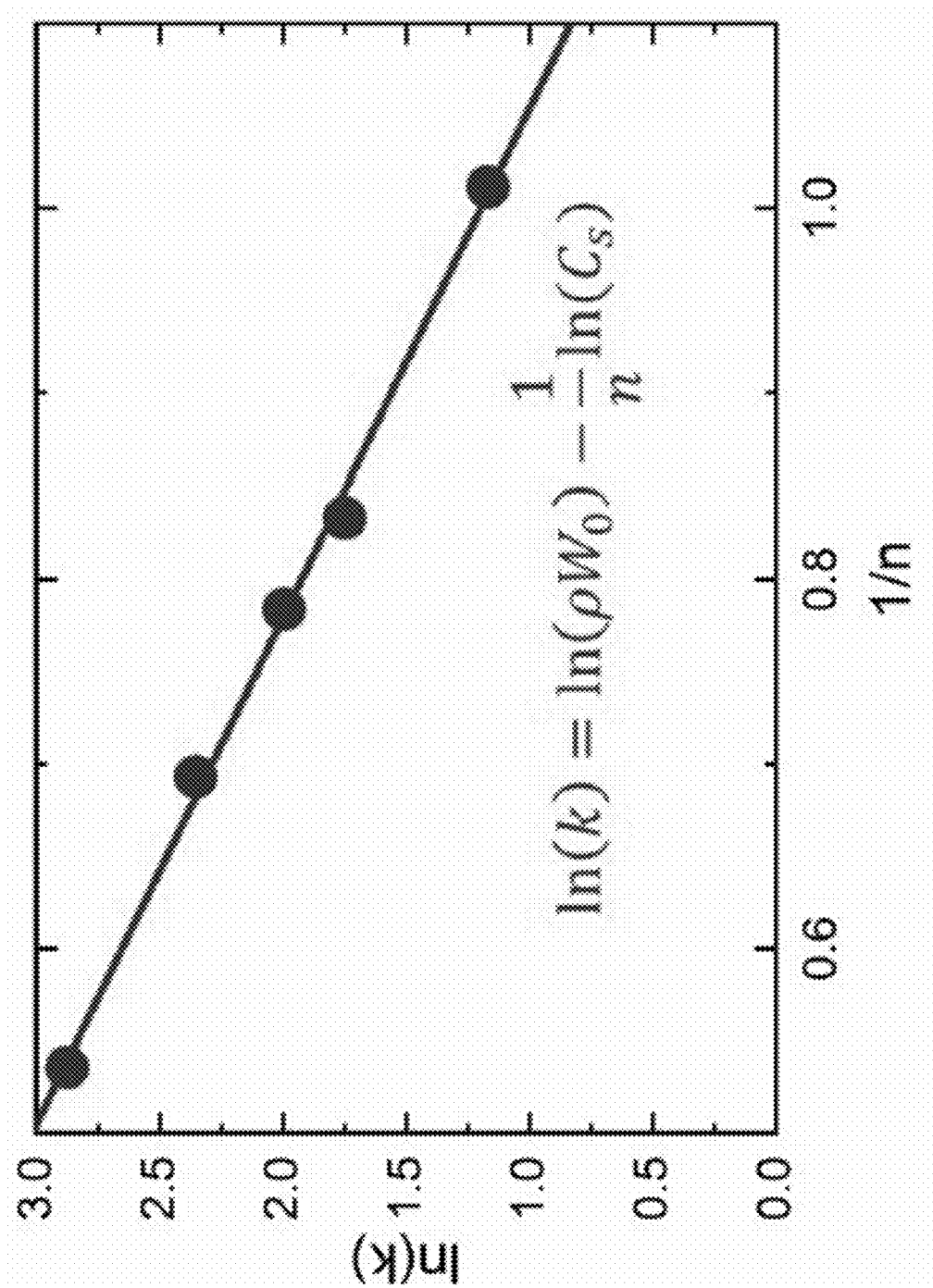
FIG. 4C shows, according to certain embodiments, the linear correlation between the Freundlich parameters ln(k) and 1/n obtained at different potentials.

The Freundlich isotherm parameters ln(k) and 1/n correlate linearly with the applied potential (see FIG. 4B), reflecting the changes in hydrophilicity of the adsorbent with charging of the electrodes; the linearity arises because the electrochemical cell exhibited capacitance-like features such that for a fixed charging time of 10 minutes, the total number of charges exchanged (and hence hydrophilicity) increased linearly with the applied potential, as shown in the inset on FIG. 4B. Moreover, FIG. 4C shows that the Freundlich equation parameters are themselves correlated linearly, as has been observed for the adsorption of a wide range of organic compounds from aqueous solution onto activated carbons. This behavior can be interpreted in terms of the Polanyi adsorption theory on the adsorption of organic compounds from an aqueous solution to a heterogeneous surface. Polanyi defined the adsorption potential ($\epsilon_s$) as the energy required to remove the molecule from a saturated solution to a point outside the attractive force field of the adsorbent, as shown below in Equation (4):

$$\epsilon_s = RT\ln\left(\frac{C_s}{C_e}\right) \quad (4)$$

where $C_s$ and $C_e$ are, respectively, the solubility limit and bulk equilibrium concentrations of the solutes in the liquid phase. Dubinin related the volume of solutes adsorbed on one gram of adsorbent to the adsorption potential via Equation (5):

$$W = W_0 \exp\left(-\frac{a}{V_s}\epsilon_s\right) \quad (5)$$

where $W_0$ is the limiting volume per gram of the adsorbent available for adsorption, a is a parameter characteristic of the adsorbent and independent of adsorbates, and $V_s$ is the molar volume of solutes. With $Q_e=\rho W$, where $\rho$ is the solute density, and with $\epsilon_s$ given by Equation (5), the mass of solute on the polymer can be written as shown below in Equation (6):

$$Q_e = \rho W_0 \left(\frac{C_e}{C_s}\right)^{\frac{aRT}{V_s}} \quad (6)$$

which is of the form given in Equation (3), and from which the fitting parameters of the Freundlich equations can be identified as shown below in Equations (7) and (8):

$$k = \rho W_0 C^{-\frac{aRT}{V_S}} \tag{7}$$

and $$\frac{1}{n} = \frac{aRT}{V_S} \tag{8}$$

Therefore resulting in Equation (9):

$$\ln(k) = \ln(\rho W_0) - \frac{1}{n}\ln(C_S) \tag{9}$$

The intercept in Equation (9) reflects the limiting capacity of the adsorbent, which should be independent of solute for solutes of similar density. The value of $\rho W_0$ estimated for the system is 130 mg/g.

The disparity in hydrophobicity and hence affinity for organics under different charging conditions allows for the simultaneous reversibility of sorption by the two adsorbents that is crucial for a swing separation process. The electroswing separation is more effective for the separation of solutes present at low concentrations where the availability of the sites for adsorption is modulated by electrochemical stimuli.

Figure 5A:
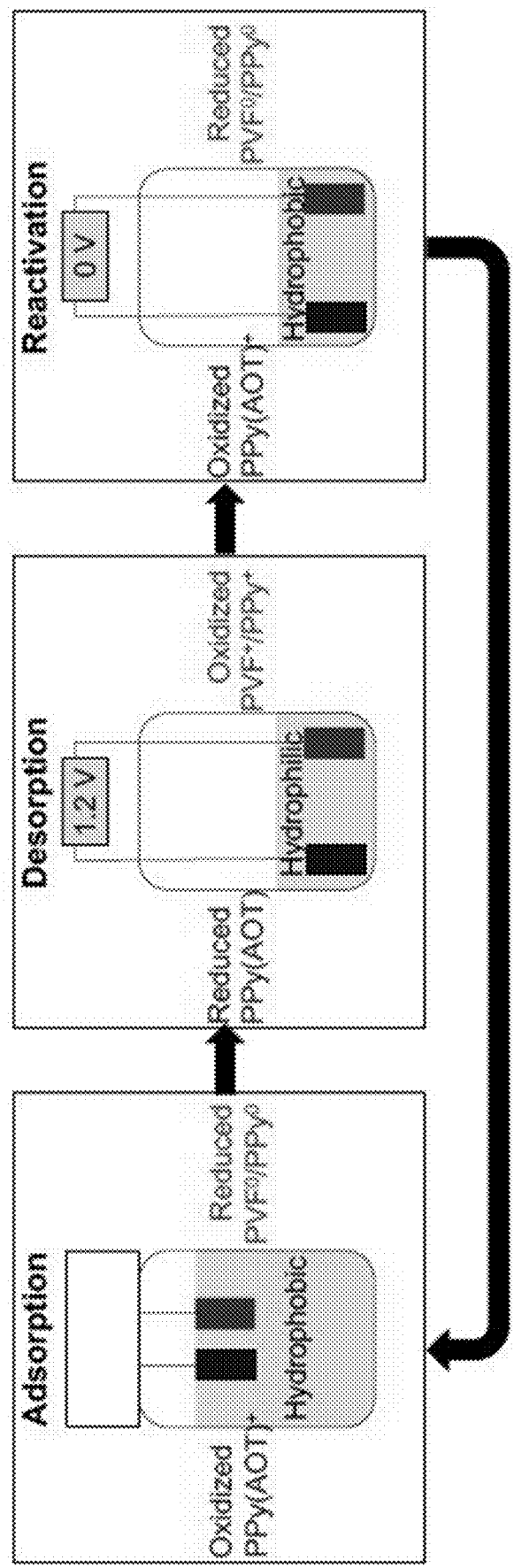
FIG. 5A shows, according to certain embodiments, a schematic illustration of a cyclic adsorption process utilizing the asymmetric system.

The potential-dependent affinity permits the use of electrochemical means to program adsorption and desorption, thereby enabling the loading and regeneration of the sorbent materials. FIG. 5A depicts the application of a PVF-PPy//PPy(AOT) asymmetric electrochemical cell for removing organics from water. The electrode pair is immersed in the feed solution, and, after reaching equilibrium, the system can be charged for 10 minutes, for example at 1.2 V, to render both polymers hydrophilic and to drive the desorption of the organics. Subsequently, the system can be discharged at 0 V for 10 minutes to return the polymers to their hydrophobic states for adsorption in the next cycle. The electrochemical characterization of the electrode cell has suggested that the half-cell potential of the asymmetric system is 0.55 V (see FIG. 3A), and therefore the electrochemical cell may also be charged and discharged at less extreme potentials, for example, at 0.9 V and 0.3 V, respectively.

Figure 5B:
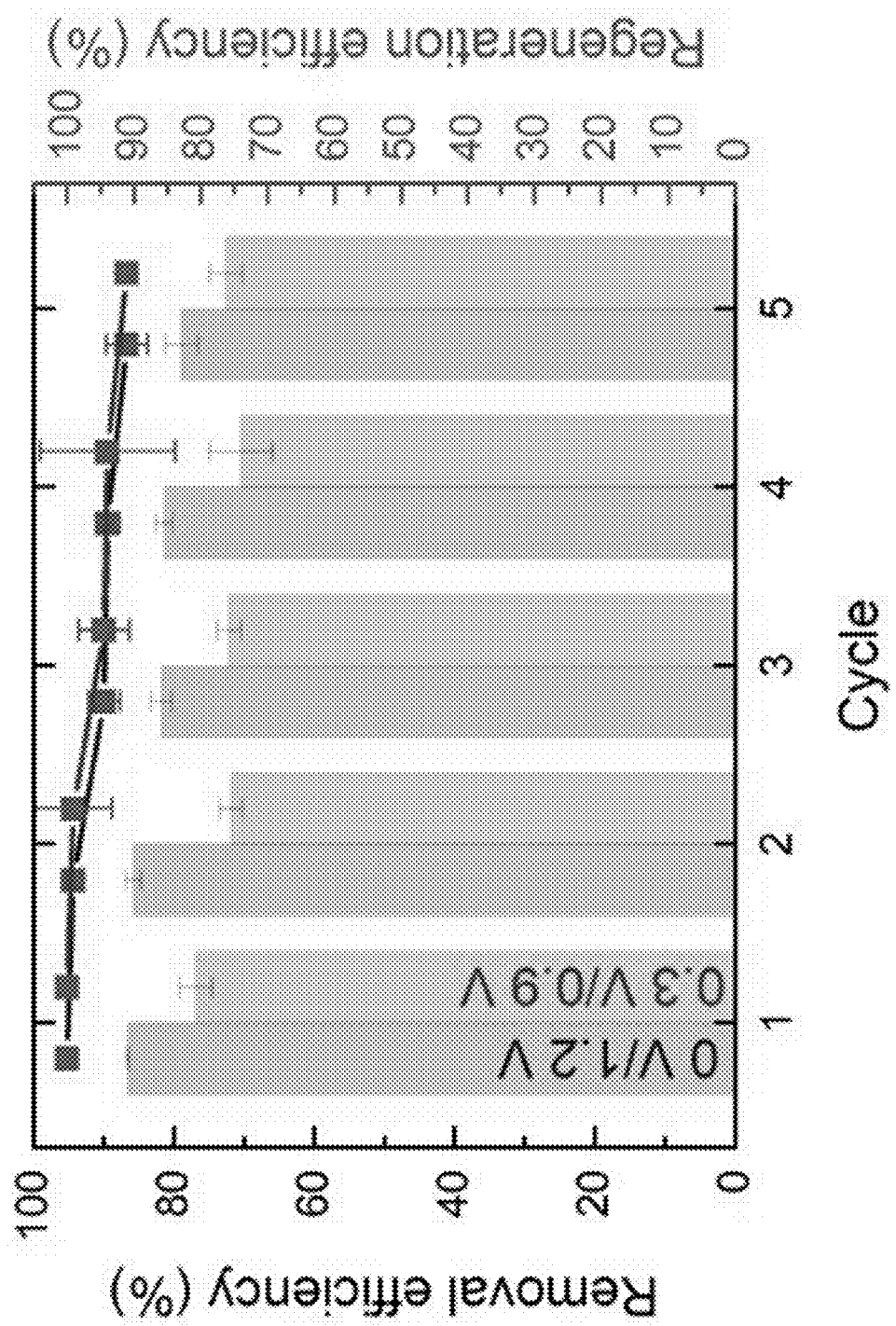
FIG. 5B shows, according to certain embodiments, removal (left y axis and bars) and regeneration (right y axis and squares) efficiencies of the asymmetric system discharged/charged at 0 V/1.2 V and 0.3 V/0.9 V over five consecutive cycles.

The reusability of both materials was explored by conducting adsorption and desorption of SOG using the asymmetric system for five consecutive cycles. FIG. 5B shows the evolution over the course of five cycles of pollutant removal efficiency (left y axis), defined as the percentage of contaminants removed from the feed, and regeneration efficiency (RE, right y axis) defined as the fraction of contaminants removed in a later cycle relative to those removed in the first cycle. The charge/discharge cycle at more extreme potentials (1.2 V and 0 V vs. 0.9 V and 0.3 V) allows roughly 10% more organics to be removed in each cycle. Moreover, most of the adsorption capacity of the asymmetric system can be recovered through electrochemical modulations, indicated by RE greater than 91% over the five cycles for either pair of applied potentials.

Since the electrochemically mediated separation process is not thermodynamically spontaneous, it requires electrochemical energy to charge the system to drive desorption, the amount of which is dependent on the potentials applied. Therefore, the optimum pair of applied potentials was determined by considering the tradeoff between energy expenditure (more extreme potentials) and separation extent (more contaminant removal), as discussed below.

A major challenge for electrochemical devices operating in an aqueous environment is the narrow stable operating voltage window afforded by water. Water splitting can cause loss of energy to side reactions and pH fluctuations that may impact the adsorption capacity. The thermodynamic potential for water electrolysis is only 1.23 V, beyond which undesired parasitic reactions will occur via Equations (10) and (11):

2H⁺+2e⁻→H₂(g) under acidic conditions, or $$2H_2O(l)+2e^-\rightarrow H_2(g)+2OH^- \text{ under basic conditions} \tag{10}$$

at the cathode, and $$2H_2O(l)\rightarrow O_2(g)+4H^++4e^- \tag{11}$$

at the anode, where Equations (10) and (11) are the hydrogen evolution (HER) and oxygen evolution (OER) reactions, respectively. In addition to the effects of the whole cell potential, a side reaction can occur if the potential window of an individual cathode or anode reaches its respective stability limit. The equilibrium potential of Equation (10) varies as a function of pH in water via Equation (12):

$$E = E^0 + \frac{k_B T}{2e}\ln\frac{a_{H^+}^2 a_{e^-}^2}{a_{H_2}} = -0.06 \text{ pH} \tag{12}$$

where $E^0=0$ V is the standard reduction potential of the HER (vs. SHE), and $a_{H^+}$, $a_{e^-}$, and $a_{H_2}$ are the activities of the reactants and reaction products. For example, with an initial pH of 6.94 in an aqueous solution, the HER can take place when the potential on the cathode reaches −0.42 V vs. SHE or −0.60 V vs. Ag/AgCl.

Cells in which the anode is functionalized with PVF-containing materials are prone to the HER side reaction when the anode is paired with various types of materials on the cathode, including platinum (Pt), carbon nanotubes, or chemically identical PVF-based material in the neutral state. In the desorption step of an electrochemically mediated separation, an electrode functionalized with PVF-PPy is oxidized to render the polymer hydrophilic. If the negative electrode is Pt, the HER with H⁺ consumption or OH⁻ production can occur to a significant extent.

FIG. 8A shows the final solution phase pH after potentials are applied to electrochemical cells consisting of a PVF-PPy positive electrode and a PPy(AOT) counter electrode, or of the two PPy-based materials independently paired with Pt. Even when a constant 1.2 V was applied to the asymmetric PVF-PPy//PPy(AOT) system for 10 minutes, where the relative potentials on PVF-PPy and PPy(AOT) were approximately 0.7 V and −0.5 V vs. Ag/AgCl, respectively, the pH increase (from an initial pH of 6.94) for the asymmetric system is quite limited because the Faradaic reaction occurring during the reduction of the PPy(AOT) electrode accommodates electrons from the oxidation of the PVF-PPy in lieu of the HER that would otherwise occur. Without a dual-functionalized asymmetric system, water splitting reactions occur to provide the necessary electrons to complement the redox reactions of PVF-PPy or PPy(AOT). The fast kinetics of HER on Pt allows the regeneration of the PVF-PPy electrode at 0.7 V vs. Ag/AgCl in a PVF-PPy//Pt system to proceed without retardation, and with an increase in the solution phase pH from nearly neutral (6.94) to 10.41.

Similarly, with Pt as the counter electrode to PPy(AOT), the OER occurs to provide electrons for the reduction of PPy (AOT) at −0.5 V vs. Ag/AgCl, with a resultant decrease in the pH to 5.48. The asymmetric electrochemical cell configuration is clearly successful in preventing pH fluctuations during the electroswing operation (see FIG. 6A).

Figure 6B:
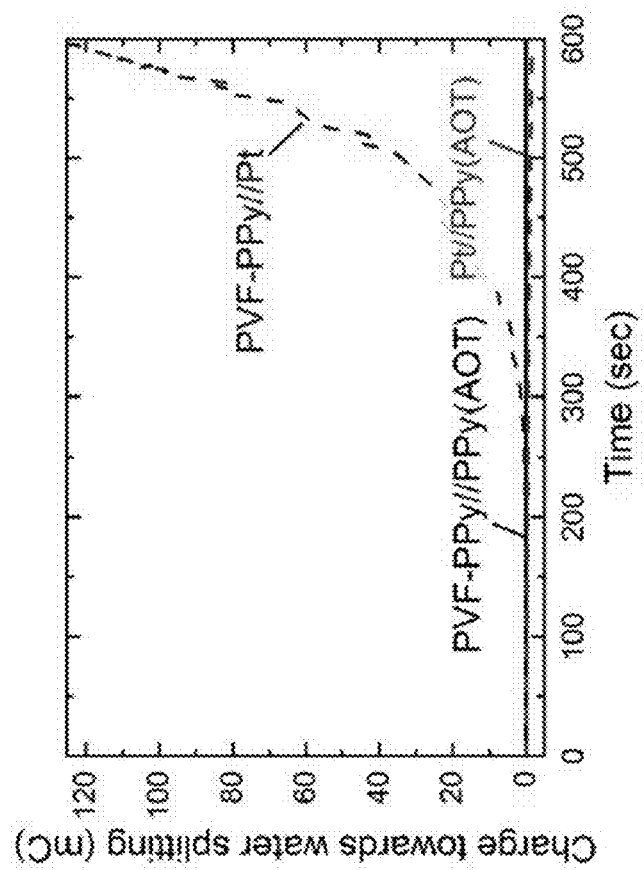
FIG. 6B shows, according to certain embodiments, the amount of charge (mC) going toward water splitting OH— production and the hydrogen evolution reaction in the course of modulating the asymmetric system as compared to PVF-PPy//Pt and Pt//PPy(AOT) systems.
Figure 6A:
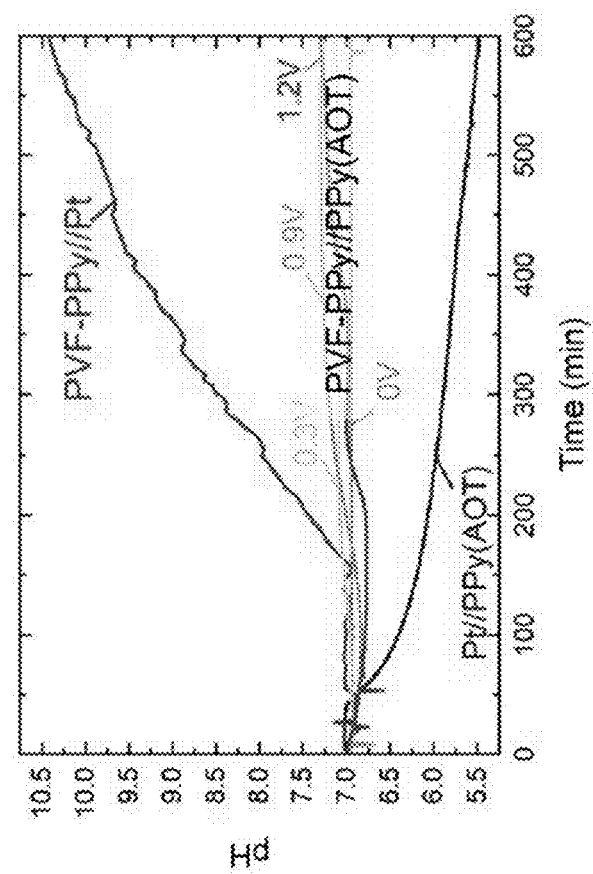
FIG. 6A shows, according to certain embodiments, pH evolution during charging of the asymmetric system as compared to PVF-PPy//Pt and Pt//PPy(AOT) systems.

The other benefit of suppressing parasitic reactions is that the Faradaic efficiency of the electrochemical modulations is enhanced. FIG. 6B shows the loss of charges to water splitting reactions in the PVF-PPy//Pt, PVF-PPy//PPy(AOT) and Pt//PPy(AOT) systems, where the positive charge refers to the production of hydroxide and negative magnitude represents the proton generation. The dual-functionalized asymmetric system PPy(AOT) counter electrode allows over 99% of the charges to be utilized in electrochemical modulation of the polymers whereas almost 42% of charges are lost to OH$^-$ production when PVF-PPy is paired with Pt. The dramatic reduction in HER enhances current efficiencies by eliminating parasitic water splitting reactions.

The ability to regenerate the adsorbent efficiently is important to avoid merely transferring contaminants from the liquid phase to the solids for disposal, and to enable reuse of the sorbent. To assess the practicality of the PPy-based asymmetric system, the economic viability and environmental impact of electrochemically mediated separations using the PPy-based system under different applied potentials was evaluated and compared with those of conventional activated carbons used extensively for the mitigation of organic contaminants, and which are regenerated by thermal desorption or solvent extraction. As with the comparison between capacitive deionization and reverse osmosis in desalination, the concept of specific energy consumption (SE), defined as energy consumption per gram of organic contaminants removed, was used to evaluate the energetic efficiencies of alternative adsorbents and regeneration strategies, as shown in Equation (13):

$$SE = \frac{E}{Q_e RE} \quad (13)$$

where E is the energy consumed per gram of adsorbent during the regeneration step (J g$^{-1}$ adsorbent), $Q_e$ is the adsorption capacity (g contaminant g$^{-1}$ adsorbent), and RE is the regeneration efficiency.

Thermal regeneration of activated carbons typically involves heating the saturated AC to remove the retained adsorbate. The intensive heating may cause changes in the carbonaceous structure of, or mass losses in, the adsorbent, or charred residues may be left behind on the AC, all of which contribute to the loss of activity in the regenerated AC. To estimate the energy consumption during the thermal regeneration of activated carbons, the heat requirements were calculated according to Equation (14):

$$Q = nC_p(T_R - T_0) \quad (14)$$

where n is the total purge gas used (mol of purge gas per gram of activated carbons), $C_p$ is the heat capacity of the purge gas, and $T_R$ and $T_0$ are the regeneration and reference temperatures, respectively.

For the PVF-PPy//PPy(AOT) asymmetric system, the energy consumption for the electrochemical regeneration is obtained from the electrical energy involved in the discharge process at the defined applied potentials, shown below in Equation (15):

$$E = \frac{qE_{app}}{m} \quad (15)$$

where q is the total charge transferred between the electrodes at the cell potential $E_{app}$ applied to the PVF-PPy//PPy(AOT) system and m is the total mass of polymers on the electrodes.

FIG. 8B lists the key parameters and compares the energetic efficiencies of the activated carbons and the PPy-based system with their respective regeneration methods. The PVF-PPy//PPy(AOT) asymmetric system, when regenerated at 0.9 V and reactivated at 0.3 V, is more efficient than when electrochemical modulations at 1.2 V/0 V are used, and more efficient than the thermal regeneration of activated carbons. The SE of the thermally regenerated activated carbons for organic compounds and the PVF-PPy//PPy (AOT) system are quite similar in magnitude.

Capital cost and material costs are also important factors for determining the economic viability of these alternative technologies. The high temperature operations demand deployment of stainless-steel equipment, incurring high capital costs, and require large-scale centralized facilities to achieve economy of scale.

Based on this analysis, it was concluded that the PVF-PPy//PPy(AOT) cell, which is regenerated at 0.9 V and subsequently reactivated by charging the system at 0.3 V, is competitive in terms of specific energy consumption (SE) among conventional systems. The SE values for the electrochemically regenerated PVF-PPy//PPy(AOT) are conservative, and can be enhanced if the energy in the reactivation (shorting) step can be recovered and stored for subsequent desorption processes. Moreover, the adsorption capacity of the PVF-PPy//PPy(AOT) used in the calculation is obtained from the cyclic experiment where the system was exposed to very dilute solutions containing Sudan Orange G and is only ~⅕ of the maximum value measured.

Many separation scenarios involve mixtures of organic compounds to remove impurities or recover valuable molecules. For example, in the manufacture of propranolol hydrochloride (PP), a β-adrenergic blocking agent widely used to treat hypertension and angina pectoris, many intermediate products emerge from the multi-step synthesis pathway, and hence need to be removed to be compliant with the regulatory requirement that the relative concentrations of individual impurities be below 0.2%. The separation ability of the PVF-PPy//PPy(AOT) system was investigated using a mixture of propranolol hydrochloride (PP) and one of the impurities found in the synthesis mixture, unreacted 1-naphthol (1-NO), which participates in an alkylation reaction with epichlorohydrin, the first reaction in the pathway to produce PP.

Figure 7B:
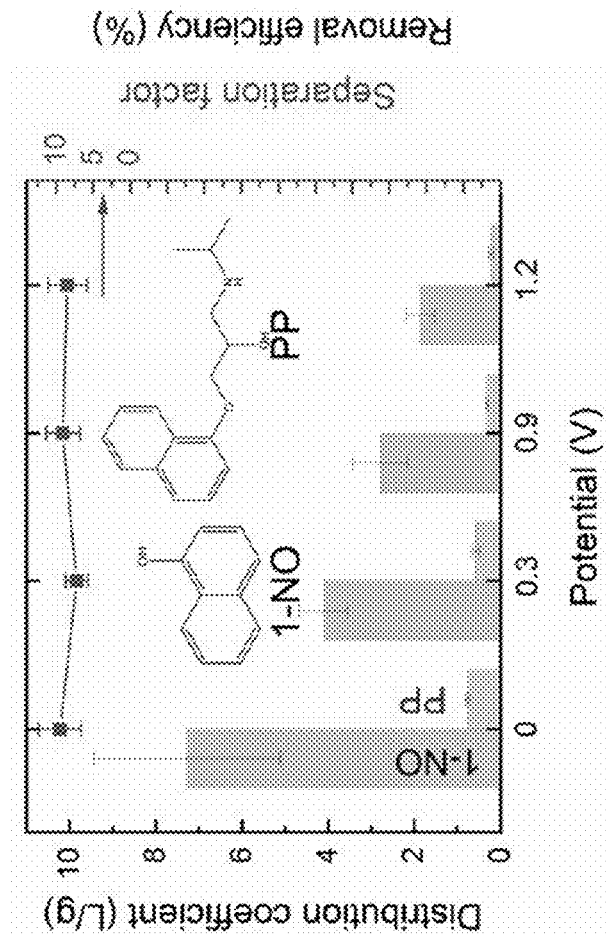
FIG. 7B shows, according to certain embodiments, removal efficiencies (left y axis and bars) and separation factors (right y axis and squares) for five consecutive cycles of separations of a PP and 1-NO mixture.
Figure 7A:
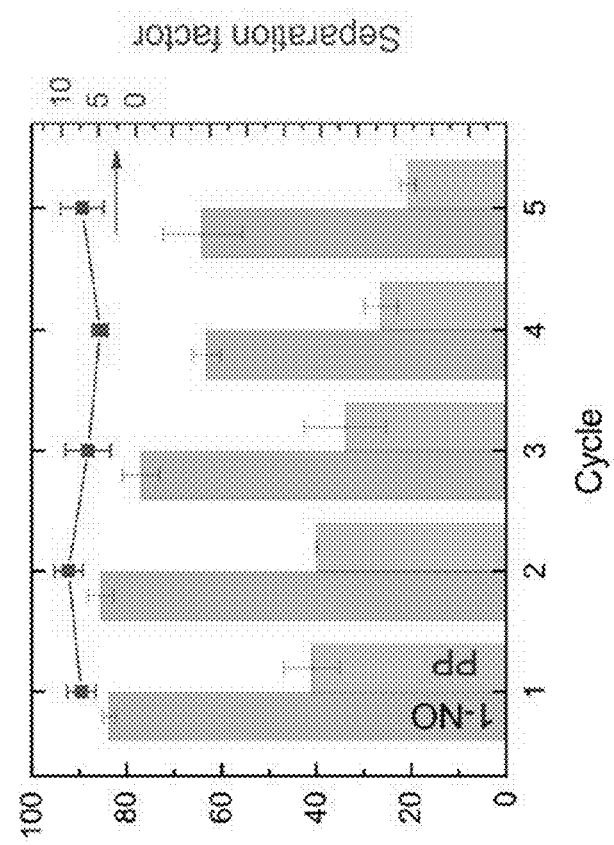
FIG. 7A shows, according to certain embodiments, equilibrium distribution coefficients $K_d$ for 1-naphthol (1-NO) and propranolol hydrochloride (PP) (left y axis and bars and the resulting separation coefficients deduced from ratios of the measured $K_d$ values (right y axis and squares)

The individual propensities of PP and 1-NO to adsorb on the PVF-PPy and PPy(AOT) electrodes was first compared by measuring their equilibrium distribution coefficients in single component solutions, via Equation (16):

$$K_d = \frac{Q_e}{C_e} \quad (16)$$

where $Q_e$ (mg g$^{-1}$) is the mass of the adsorbed organic compound (PP or 1-NO) per gram of polymer, and $C_e$ (mg L$^{-1}$) is the concentration of the respective compound in the liquid phase. As shown in FIG. 7A, the $K_d$ values for 1-NO are higher than those for PP at the corresponding potentials, suggesting higher selectivity for 1-NO impurities over PP will be afforded by the asymmetric system. The separation factor (a) defined as the ratio of the distribution coefficients for 1-NO and PP, as shown in Equation (17), is on average 8.5 for the different applied potentials (see FIG. 7A).

$$\alpha = \frac{K_{d,1-NO}}{K_{d,PP}} \quad (17)$$

The selectivity and reusability of the PVF-PPy//PPy (AOT) asymmetric system was tested by conducting five consecutive separations of a binary mixture of 30.6 mg $L^{-1}$ PP and 3.6 mg $L^{-1}$ 1-NO, a concentration ratio which simulates that of a typical product-impurity mixture. FIG. 7B shows that up to 85% of 1-NO can be removed while only roughly 40% of PP is taken up in the first cycle. Moreover, the removal efficiency of PP suffers a greater loss compared to that of 1-NO in subsequent cycles. The observed separation factor when the binary mixture of PP and 1-NO is challenged is on average 7.0 (see FIG. 7B), slightly lower than that deduced from the ratio of $K_d$ values measured with a single component present in the solution, likely due to the competitive binding of PP and 1-NO onto PVF-PPy//PPy(AOT).

It was demonstrated that the asymmetric system can maintain over 91% of the initial capacity over five consecutive adsorption/desorption cycles. Past studies have shown that the PVF-PPy and PPy(AOT) materials can sustain greater than 50 cycles of electrochemical charging/discharging. One potential source of instability is the leaching of the AOT dopants due to a decrease in electrostatic interaction when PPy(AOT) is reduced. If AOT anions leached into the desorption solution they would become new contaminants, as well as cause a decrease in the ability to modulate the hydrophobicity of the PPy polymer. An AOT surfactant of the monomer form is less toxic than that at higher concentrations (3 mM or 96 ppm sulfur) at which micelles are formed, according to an in vitro study of AOT stabilized silver nanoparticles.[52] Due to the geometry of AOT, however, it is difficult for AOT surfactants alone to form micelles in water.

The leaching of AOT dopants was investigated by monitoring the sulfur content in the desorption solution using an inductively coupled plasma optical emission spectrometer (ICP-OES) with a detection limit down to 0.1 ppm. No sulfur content was detected in the desorption solution after applying 1.2 V to the asymmetric system, the highest potential considered in this study, suggesting stability of the materials suitable for the application.

The two types of polypyrrole-based electrodes were prepared through electropolymerization methods on a PARSTAT MC 2000 potentiostat with an auxiliary electrometer (Princeton Applied Research) in a three-electrode configuration. The working, counter, and reference electrodes were carbon fiber cloth (ElectroChem Inc.), a platinum wire (BASi), and Ag/AgCl (3 M NaCl), respectively. For PPy (AOT), the electropolymerization bath contained 0.3 M pyrrole (Millipore Sigma), 0.3 mg/mL bipyrrole (Toronto Research Chemicals), and 0.1 M sodium dioctyl sulfosuccinate (Millipore Sigma). A constant current density of 2.5 mA/cm² was applied for 5 minutes to yield a polymer loading of 2.85±0.08 mg/cm². For PVF-PPy, the bath contained 2 mg/mL PVF (molecular weight 50,000 g/mol, Polysciences), 0.2 M pyrrole, and 0.1 M tetrabutylammonia perchlorate (Millipore Sigma) in chloroform. A constant current potential of 0.7 V was applied for 10 minutes to yield a polymer loading of 5.68±0.47 mg/cm². CV measurements were done in 0.1 M potassium chloride (KCl) aqueous solution.

Adsorption studies were performed at ambient temperature in 20 mL scintillation vials continuously shaken at 150 rpm/min to increase mixing. The concentrations of the model contaminant Sudan Orange G, and pharmaceutical synthesis compounds propranolol hydrochloride (PP) and 1-naphthol (1-NO) (Millipore Sigma) in the aqueous phase (CO were measured by a Cary 60 Ultraviolet-visible (UV-vis) spectroscope. The mass of solute adsorbed to PPy (AOT)- and PVF-PPy-coated electrodes was determined as $$Q_e = \frac{(C_0 - C_e)Vol}{m},$$

where $Q_e$ (mg $g^{-1}$ polymer) is the solute adsorbed per gram of polymer, Co (mg $L^{-1}$) and $C_e$ (mg $L^{-1}$) are the initial and final solute concentrations in the solution phase, respectively, m (g) is the mass of the particular type of polymer on the carbon fiber cloth substrate, and Vol (L) is the volume of solution. The Freundlich isotherm equation was fitted to the batch adsorption data. The two electrodes were assembled into the PVF-PPy//PPy(AOT) asymmetric system for adsorption studies and both materials were rendered hydrophobic by discharging at 0 V or 0.3 V, and equilibrium was reached. The adsorption process was monitored for up to 24 hours and equilibrium was typically reached with 10 hours. The system was regenerated by applying a positive potential (1.2 V or 1.5 V) for 10 minutes in 5 mL of 0.1 M KCl solution. To reuse the electrodes in subsequent cycles of adsorption, the polymer was reactivated for adsorption by applying 0 V or 0.3 V for 10 minutes in the same 0.1 M KCl desorption solution. Concentrations of PP and 1-NO in the binary mixture were determined using high-performance liquid chromatography (HPLC) equipped with a flame-ionization detector (FID) (Agilent) and a ZORBAX Extend 80 Å C18 (4.6×50 mm, 5 μm) analytical column (2.1 mm×50 mm, particle size 3.5 μm). Samples for the HPLC analysis were prepared by adding 20 μL of N-benzylmethylamine as internal standards to 1 mL of solutions. Five microliters of samples were injected and eluted using a gradient pump delivering 1 mL $min^{-1}$ of a water and acetonitrile mobile phase, each containing 0.1 vol. % formic acid. OpenLab CDS software was used to determine the area under the peaks in the chromatograms and to carry out baseline correction. All results reported are based on the average of three replicates.

To assess the impact of parasitic reactions due to water electrolysis, pH was monitored in-situ during electrochemical modulation of the hydrophobicity of the materials through potential swings. A custom LabView program and the Orion ROSS Combination Semi-micro pH Electrode were used to collect the pH data. The evolution of $OH^-$ was directly computed from pH fluctuations and subsequently converted to the charges lost to hydrogen or oxygen evolution reactions, respectively.

In order to assess the leaching of AOT during desorption, an inductively coupled plasma optical emission spectrometer (ICP-OES Optima 8000, PerkinElmer, USA) equipped with a GemTip Cross-flow II nebulizer and a Ryton® HF-resistant Scott-type spray chamber was used to determine the sulfur content in the desorption solution. Standard solutions for creating the sulfur calibration curve were prepared by sequential dilution of a stock solution (Millipore Sigma 1000 mg L$^{-1}$ S in H$_2$O). The operating conditions for the ICP-OES analysis were: wavelength 180.669 nm, radio frequency power of 1500 W, principal plasma gas flow-rate of 10.0 L min$^{-1}$, auxiliary gas flow-rate of 0.2 L min$^{-1}$ and nebulizer gas flow-rate of 0.7 L min$^{-1}$.

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell, comprising:
    a first electrode comprising a first electrically conductive substrate and a first coating disposed on at least a portion of the first electrically conductive substrate, wherein the first coating comprises a first adsorbent polymer and a redox-active polymer; and
    a second electrode comprising a second electrically conductive substrate and a second coating disposed on at least a portion of the second electrically conductive substrate, wherein the second coating comprises a second adsorbent polymer and a surfactant,
    wherein the first electrode and the second electrode are configured to adsorb a target molecule without an energetic cost.

2. The electrochemical cell of claim 1, wherein the first electrically conductive substrate and/or the second electrically conductive substrate comprise carbon.

3. The electrochemical cell of claim 1, wherein the first adsorbent polymer and/or the second adsorbent polymer comprise polypyrrole.

4. The electrochemical cell of claim 1, wherein the redox-active polymer comprises a metallocene.

5. The electrochemical cell of claim 1, wherein the redox-active polymer comprises polyvinylferrocene.

6. The electrochemical cell of claim 1, wherein the surfactant comprises dioctyl sulfosuccinate and/or dodecylbenzenesulfonate.

7. The electrochemical cell of claim 1, wherein the electrochemical cell comprises the first electrode and the second electrode in a mass loading ratio of 2:1.

8. The electrochemical cell of claim 1, wherein the target molecule is an organic compound.

9. The electrochemical cell of claim 1, wherein the target molecule is a neutral organic compound.

10. The electrochemical cell of claim 1, wherein the target molecule is a pharmaceutical, dye, pesticide, herbicide, personal care product, tobacco extract, and/or by-product thereof.

11. The electrochemical cell of claim 1, wherein the target molecule is Sudan Orange G, 2,4-dichlorophenol, propranolol hydrochloride, 1-napththol, 2-napththol, 1-napththylamine, bisphenol A, bisphenol S, metolachlor, ethinyl estradiol, methyl orange, and/or rhodamine B.

12. The electrochemical cell of claim 1, wherein the energetic cost is the application of an electrical potential.

13. The electrochemical cell of claim 1, wherein the first electrode and the second electrode are configured to adsorb the target molecule from a mixture of organic compounds without an energetic cost.

14. The electrochemical cell of claim 1, wherein the first electrode and the second electrode are configured to adsorb the same target molecule.

15. A system comprising the electrochemical cell of claim 1.

\* \* \* \* \*